United States Patent
Gao

(10) Patent No.: US 12,470,354 B2
(45) Date of Patent: Nov. 11, 2025

(54) CARRIER SWITCHING TRANSMISSION METHOD AND APPARATUS, AND TERMINAL AND NETWORK-SIDE-DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 18/555,635

(22) PCT Filed: Mar. 14, 2022

(86) PCT No.: PCT/CN2022/080615
§ 371 (c)(1),
(2) Date: Oct. 16, 2023

(87) PCT Pub. No.: WO2022/218077
PCT Pub. Date: Oct. 20, 2022

(65) Prior Publication Data
US 2024/0214160 A1   Jun. 27, 2024

(30) Foreign Application Priority Data

Apr. 16, 2021   (CN) .......................... 202110414398.3

(51) Int. Cl.
*H04L 5/00* (2006.01)
*H04W 72/1268* (2023.01)
*H04W 72/21* (2023.01)

(52) U.S. Cl.
CPC .......... *H04L 5/0053* (2013.01); *H04L 5/0094* (2013.01); *H04W 72/1268* (2013.01); *H04W 72/21* (2023.01)

(58) Field of Classification Search
CPC .... H04L 5/0053; H04L 5/0094; H04W 72/21; H04W 72/1268
(Continued)

(56) References Cited

U.S. PATENT DOCUMENTS

2006/0268720 A1* 11/2006 Rong .................... H04L 1/1692
370/335
2015/0305016 A1   10/2015 Dai et al.
(Continued)

FOREIGN PATENT DOCUMENTS

CN         102355733 A    2/2012
CN         110830176 A    2/2020
(Continued)

OTHER PUBLICATIONS

International Search Report and Written Opinion issued Jun. 1, 2022 in International Application No. PCT/CN2022/080615.
(Continued)

*Primary Examiner* — Chi Tang P Cheng
(74) *Attorney, Agent, or Firm* — Harness, Dickey & Pierce, P.L.C.

(57) ABSTRACT

A carrier switching transmission method and apparatus, and a terminal and a network-side device are provided. The method includes: when a plurality of physical uplink control channels PUCCHs transmitted on a first carrier needs to do carrier switching and all of the plurality of PUCCHs are determined to be transmitted in a first time unit on a second carrier after the carrier switching, sending by a terminal one or more PUCCHs in the first time unit on the second carrier according to a first rule after the carrier switching, wherein
(Continued)

---

When a plurality of physical uplink control channels (PUCCHs) transmitted on a first carrier needs to do carrier switching, and each of the plurality of PUCCHs is determined to be transmitted in a first time unit on a second carrier after the carrier switching, sending PUCCHs in the first time unit on the second carrier by the terminal according to a first rule after the carrier switching, wherein the plurality of PUCCHs does not overlap in a time domain on the first carrier. — 101 the plurality of PUCCHs does not overlap in a time domain on the first carrier. PUCCH transmission may be implemented through PUCCH carrier switching.

16 Claims, 4 Drawing Sheets

(58) Field of Classification Search
USPC .......................................................... 370/329
See application file for complete search history.

(56) References Cited

U.S. PATENT DOCUMENTS

| 2020/0305186 | A1 | 9/2020 | Alfarhan et al. | |
|---|---|---|---|---|
| 2021/0314105 | A1 | 10/2021 | Gao et al. | |
| 2022/0085925 | A1 | 3/2022 | Gao | |
| 2022/0131677 | A1* | 4/2022 | Lin | H04L 5/0091 |

FOREIGN PATENT DOCUMENTS

| CN | 110943815 A | 3/2020 |
|---|---|---|
| CN | 111543109 A | 8/2020 |
| CN | 111585728 A | 8/2020 |
| CN | 112291035 A | 1/2021 |
| WO | WO-2017/167003 A1 | 10/2017 |
| WO | WO-2021/035667 A1 | 3/2021 |

OTHER PUBLICATIONS

Asia Pacific Telecom, FGI, "Discussion on UE feedback enhancements for HARQ-ACK," 3GPP TSG-RAN WG1 Meeting #104-e, R1-2100968, Jan. 19, 2021.

China Telecom, "Discussion on UE feedback enhancements for HARQ-ACK," 3GPP TSG RAN WG1 #104, R1-2100911, Jan. 17, 2021.

First Office Action issued Jun. 26, 2023 in Chinese Application No. 2021104143983.

Extended European search report issued Apr. 29, 2024 in European Application No. 22787307.2.

Moderator(Nokia), "Moderator summary on Rel-17 HARQ-ACK feedback enhancements for NR Rel-17 URLLC/IIoT (AI 8.3.1.1)—end of meeting," 3GPP TSG-RAN WG1 Meeting #103-e, R1-2009789, Oct. 26, 2020.

Nokia, "Multiplexing of overlapping PUCCH and PUSCH with different numerologies," 3GPP TSG RAN WG1 #97, R1-1907441, May 13, 2019.

ZTE, "Discussion on HARO-ACK enhancements for eURLLC," 3GPP TSG RAN WG1 Meeting #104b-e, R1-2102493, Apr. 12, 2021.

China Telecom, "Discussion on UE feedback enhancements for HARQ-ACK," 3GPP TSG RAN WG1 #104b, R1-2102867, Apr. 12, 2021.

Second Office Action issued Mar. 21, 2024 in Chinese Application No. 202110414398.3.

* cited by examiner

When a plurality of physical uplink control channels (PUCCHs) transmitted on a first carrier needs to do carrier switching, and each of the plurality of PUCCHs is determined to be transmitted in a first time unit on a second carrier after the carrier switching, sending PUCCHs in the first time unit on the second carrier by the terminal according to a first rule after the carrier switching, wherein the plurality of PUCCHs does not overlap in a time domain on the first carrier. ⟵ 101

FIG. 1

When a plurality of physical uplink control channels (PUCCHs) transmitted on a first carrier needs to do carrier switching, and each of the plurality of PUCCHs is determined to be transmitted in a first time unit on a second carrier after carrier switching, receiving the plurality of PUCCHs in the first time unit on the second carrier by a network-side device according to a first rule after the carrier switching, wherein the plurality of PUCCHs does not overlap in a time domain on the first carrier ⟵ 201

FIG. 2

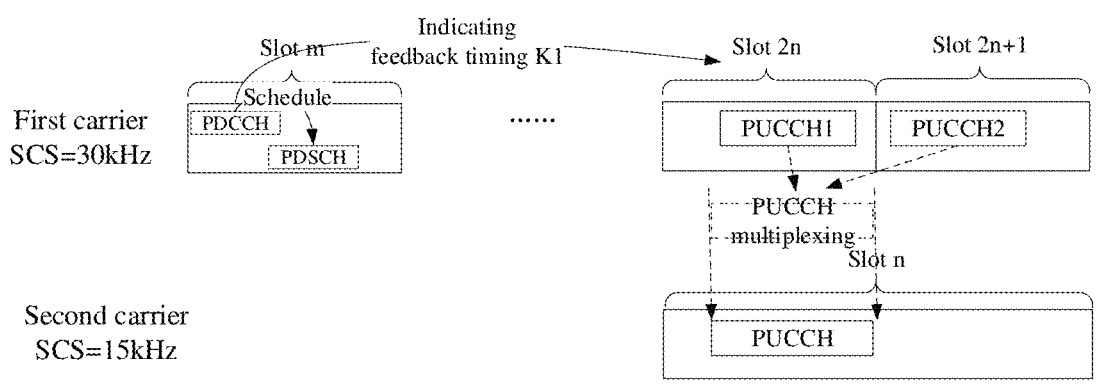

FIG. 3

CARRIER SWITCHING TRANSMISSION METHOD AND APPARATUS, AND TERMINAL AND NETWORK-SIDE-DEVICE

CROSS-REFERENCE TO RELATED APPLICATION

This application is the U.S. national phase of PCT Application No. PCT/CN2022/080615 filed on Mar. 14, 2022, which claims a priority to Chinese Patent Application No. 202110414398.3 filed in China on Apr. 16, 2021, the disclosures of each of which are incorporated in their entirety by reference herein.

TECHNICAL FIELD

The present disclosure relates to the technical field of communications, and in particular, to a carrier switching transmission method, a carrier switching transmission apparatus, a terminal, and a network-side device.

BACKGROUND

There is a large number of Ultra-Reliable and Low Latency Communication (URLLC) services in the related art, requirement of URLLC services on latency is very low, uplink transmission and downlink transmission of the URLLC services on a non-paired spectrum are required to be Time Division Multiplexing (TDM) transmissions, considering that the uplink transmission and the downlink transmission on a non-paired spectrum share the same spectrum resource. Therefore, in one carrier group, carriers on which transmission of a Physical Uplink Control Channel (PUCCH) may be configured may be limited to a ratio of uplink to downlink, and as a result, available uplink resources cannot be found at a time-domain position closest to a position satisfying the processing time of downlink transmission, such as the position satisfying the processing delay is just a time-domain position of downlink transmission. In this case, if waiting to use the available uplink resource on the carrier of transmitting the PUCCH, then a transmission delay is caused and URLLC performance is affected.

A currently proposed solution is to perform PUCCH carrier switching, that is, an original carrier configured for transmission of the PUCCH is switched to another carrier for transmission of the PUCCH, so that there is no need to delay transmission of the PUCCH when a scheduling resource of the original carrier is insufficient or a resource conflict occurs. However, how to specifically perform PUCCH transmission by using the method of PUCCH carrier switching has not been provided.

SUMMARY

An objective of the present disclosure is to provide a carrier switching transmission method and a carrier switching transmission apparatus, a terminal, and a network-side device, for solving the problem of how to perform PUCCH transmission by using a PUCCH carrier switching method.

In order to achieve the above objective, a carrier switching transmission method is provided. This method includes:
when a plurality of physical uplink control channels (PUCCHs) transmitted on a first carrier needs to do carrier switching and all of the plurality of PUCCHs are determined to be transmitted in a first time unit on a second carrier after the carrier switching, sending by a terminal one or more PUCCHs after the carrier switching in the first time unit on the second carrier according to a first rule,
wherein the plurality of PUCCHs does not overlap in a time domain on the first carrier.

Sending by the terminal the one or more PUCCHs after the carrier switching in the first time unit on the second carrier according to the first rule includes:
rule 1: determining a first PUCCH resource in the first time unit on the second carrier, multiplexing uplink control information (UCI) carried by the plurality of PUCCHs on the first PUCCH resource, and sending the multiplexed UCI in the first time unit on the second carrier;
rule 2: sending multiple PUCCHs in the first time unit on the second carrier in a time division multiplexing (TDM) manner, wherein each PUCCH of the multiple PUCCHs corresponds to one of the plurality of PUCCHs;
rule 3: selecting part of the plurality of PUCCHs, discarding part of the plurality of PUCCHs, and sending a PUCCH corresponding to the selected part of the plurality of PUCCHs in the first time unit on the second carrier by using the rule 1 or the rule 2;
rule 4: determining as an error schedule or configuration.

When the rule 1 is used, determining the first PUCCH resource in the first time unit on the second carrier includes one of following:
first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;
second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set preconfigured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;
third method: determining a first-type PUCCH resource pre-configured on the second carrier as the first PUCCH resource, wherein there is one there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;
fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

When the first method is used, a frequency domain resource of the first PUCCH resource is same as a frequency domain resource of the second PUCCH resource, and/or a code domain resource of the first PUCCH resource is same as a code domain resource of the second PUCCH resource.

When the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier.

When determining that the first PUCCH resource is the first-type PUCCH resource, the method further includes:
  obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;
  multiplexing, on the first PUCCH resource based on the minimum quantity of RBs, the UCI carried by the plurality of PUCCHs, and sending the multiplexed UCI in the first time unit on the second carrier.

The method further includes:
  when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached.

When using the fourth method, determining the first PUCCH resource includes:
  when the PUCCH resource set includes only one first-type PUCCH resource and one second-type PUCCH resource, determining a PUCCH resource from the one first-type PUCCH resource and the one second-type PUCCH resource as the first PUCCH resource according to the quantity of bits of the UCI; or
  when the PUCCH resource set includes a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources includes a plurality of PUCCH resources, selecting a PUCCH resource, satisfying a first preset condition, from the determined type of PUCCH resources as the first PUCCH resource;
  wherein the first preset condition is one of following:
  a starting position does not exceed a starting position of any PUCCH resource corresponding to the plurality of PUCCHs on the first carrier;
  a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;
  processing time requirement of the UCI transmission is satisfied.

If a quantity of PUCCH resources satisfying the first preset condition is multiple, a PUCCH resource is determined as the first PUCCH resource according to a preset selection rule, wherein the preset selection rule is at least one of following:
  selecting a PUCCH resource with an earliest starting symbol;
  selecting a PUCCH resource occupying a least quantity of symbols;
  selecting a PUCCH resource which meets a minimum carrying capacity;
  selecting a PUCCH resource with a smallest PUCCH resource index.

When the rule 2 is used, the method further includes:
  determining a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

The method further includes at least one of:
  when a same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;
  for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;
  for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, carried on the one PUCCH, in the first time unit on the second carrier by using the third PUCCH resource, wherein the third-type PUCCH formats are PUCCH formats having a symbol quantity greater than or equal to the second threshold;
  for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

To achieve the above objective, a carrier switching transmission method is further provided. The method includes:
  when a plurality of physical uplink control channels (PUCCHs) transmitted on a first carrier needs to do carrier switching and all of the plurality of PUCCHs are determined to be transmitted in a first time unit on a second carrier after the carrier switching, receiving by a network-side device one or more PUCCHs after the carrier switching in the first time unit on the second carrier according to a first rule,
  wherein the plurality of PUCCHs does not overlap in a time domain on the first carrier.

Sending by the network-side device the one or more PUCCHs after the carrier switching in the first time unit on the second carrier according to the first rule includes:
  rule 1: determining a first PUCCH resource in the first time unit on the second carrier, and receiving the one or more PUCCHs by using the first PUCCH resource in the first time unit on the second carrier, wherein the first PUCCH resource is used to carry simultaneously Uplink Control Information (UCI) carried by the plurality of PUCCHs;
  rule 2: receiving multiple PUCCHs in the first time unit on the second carrier in a time division multiplexing (TDM) manner, wherein each PUCCH of the multiple PUCCHs corresponds to one of the plurality of PUCCHs;
  rule 3: selecting part of the plurality of PUCCHs, discarding part of the plurality of PUCCHs, and receiving a PUCCH corresponding to the selected part of the plurality of PUCCHs in the first time unit on the second carrier by using the rule 1 or the rule 2;
  rule 4: determining as an error schedule or configuration.

When the rule 1 is used, determining the first PUCCH resource in the first time unit on the second carrier includes one of following:
  first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;
  second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set preconfigured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;
  third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;
  fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

When the first method is used, a frequency domain resource of the first PUCCH resource is same as a frequency domain resource of the second PUCCH resource, and/or a code domain resource of the first PUCCH resource is same as a code domain resource of the second PUCCH resource.

When the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier.

When determining that the first PUCCH resource is the first-type PUCCH resource, the method further includes:
  obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;
  receiving the one or more PUCCHs through the first PUCCH resource in the first time unit on the second carrier based on the minimum quantity of RBs, wherein the first PUCCH resource simultaneously carries UCI carried by the plurality of PUCCHs.

The method further includes: when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached.

When using the fourth method, determining the first PUCCH resource includes:
  when the PUCCH resource set includes only one first-type PUCCH resource and one second-type PUCCH resource, determining a PUCCH resource from the one first-type PUCCH resource and the one second-type PUCCH resource as the first PUCCH resource according to the quantity of bits of the UCI; or
  when the PUCCH resource set includes a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources includes a plurality of PUCCH resources, selecting a PUCCH resource, satisfying a first preset condition, from the determined type of PUCCH resources as the first PUCCH resource;
  wherein the first preset condition is one of following:
  a starting position does not exceed a starting position of any PUCCH resource corresponding to the plurality of PUCCHs on the first carrier;

a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;

processing time requirement of the UCI transmission is satisfied.

If a quantity of PUCCH resources satisfying the first preset condition is multiple, a PUCCH resource is determined as the first PUCCH resource according to a preset selection rule, wherein the preset selection rule is at least one of following:

selecting a PUCCH resource with an earliest starting symbol;

selecting a PUCCH resource occupying a least quantity of symbols;

selecting a PUCCH resource which meets a minimum carrying capacity;

selecting a PUCCH resource with a smallest PUCCH resource index.

When the rule 2 is used, the method further includes:

determining a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

The method further includes at least one of following:

when a same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;

for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;

for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, carried on the one PUCCH, in the first time unit on the second carrier by using the third PUCCH resource, wherein the third-type PUCCH formats are PUCCH formats having a symbol quantity greater than or equal to the second threshold;

for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

To achieve the above objective, a terminal is further provided. The terminal includes:

a memory, a transceiver, and a processor, wherein the memory is configured to store program instructions, the transceiver is configured to transmit and receive data under control of the processor, the processor is configured to read the program instructions in the memory and perform following operations:

when a plurality of physical uplink control channels (PUCCHs) transmitted on a first carrier needs to do carrier switching and all of the plurality of PUCCHs are determined to be transmitted in a first time unit on a second carrier after the carrier switching, sending one or more PUCCHs after the carrier switching in the first time unit on the second carrier according to a first rule, wherein the plurality of PUCCHs does not overlap in a time domain on the first carrier.

The processor is configured to read the program instructions in the memory and perform following operations:

rule 1: determining a first PUCCH resource in the first time unit on the second carrier, multiplexing, on the first PUCCH resource, uplink control information (UCI) carried by the plurality of PUCCHs, and sending the multiplexed UCI in the first time unit on the second carrier;

rule 2: sending multiple PUCCHs in the first time unit on the second carrier in a time division multiplexing (TDM) manner, wherein each PUCCH of the multiple PUCCHs corresponds to one of the plurality of PUCCHs;

rule 3: selecting part of the plurality of PUCCHs, discarding part of the plurality of PUCCHs, and sending a PUCCH corresponding to the selected part of the plurality of PUCCHs in the first time unit on the second carrier by using the rule 1 or the rule 2;

rule 4: determining as an error schedule or configuration.

When the rule 1 is used, the processor is configured to read the program instructions in the memory and perform the following operations:

first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;

second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

When the first method is used, a frequency domain resource of the first PUCCH resource is same as a frequency domain resource of the second PUCCH resource, and/or a code domain resource of the first PUCCH resource is same as a code domain resource of the second PUCCH resource.

When the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier.

When determining that the first PUCCH resource is the first-type PUCCH resource, the processor is configured to read the program instructions in the memory and perform the following operations:
  obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;
  multiplexing, on the first PUCCH resource based on the minimum quantity of RBs, the UCI carried by the plurality of PUCCHs, and sending the multiplexed UCI in the first time unit on the second carrier.

The processor is configured to read the program instructions in the memory and perform the following operations:
  when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached.

When using the fourth method, the processor is configured to read program instructions in the memory and perform the following operations:
  when the PUCCH resource set includes only one first-type PUCCH resource and one second-type PUCCH resource, determining a PUCCH resource from the one first-type PUCCH resource and the one second-type PUCCH resource as the first PUCCH resource according to the quantity of bits of the UCI; or
  when the PUCCH resource set includes a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources includes a plurality of PUCCH resources, selecting a PUCCH resource, satisfying a first preset condition, from the determined type of PUCCH resources as the first PUCCH resource;
  wherein the first preset condition is one of following:
  a starting position does not exceed a starting position of any PUCCH resource corresponding to the plurality of PUCCHs on the first carrier;
  a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;
  processing time requirement of the UCI transmission is satisfied.

If a quantity of PUCCH resources satisfying the first preset condition is multiple, a PUCCH resource is determined as the first PUCCH resource according to a preset selection rule, wherein the preset selection rule is at least one of following:
  selecting a PUCCH resource with an earliest starting symbol;
  selecting a PUCCH resource occupying a least quantity of symbols;
  selecting a PUCCH resource which meets a minimum carrying capacity;
  selecting a PUCCH resource with a smallest PUCCH resource index.

When the rule 2 is used, the processor is configured to read the program instructions in the memory and perform the following operations:
  determining a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

The processor is configured to read the program instructions in the memory and perform the following operations:
  when a same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;
  for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;
  for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, carried on the one PUCCH, in the first time unit on the second carrier by using the third PUCCH resource, wherein the third-type PUCCH formats are PUCCH formats having a symbol quantity greater than or equal to the second threshold;

for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

To achieve the above objective, a carrier switching transmission apparatus is further provided. This apparatus includes:

a sending unit, configured to when a plurality of physical uplink control channels (PUCCHs) transmitted on a first carrier needs to do carrier switching and all of the plurality of PUCCHs are determined to be transmitted in a first time unit on a second carrier after the carrier switching, send one or more PUCCHs after the carrier switching in the first time unit on the second carrier according to a first rule, wherein the plurality of PUCCHs does not overlap in a time domain on the first carrier.

The sending unit is specifically configured to:

rule 1: determine a first PUCCH resource in the first time unit on the second carrier, multiplex uplink control information (UCI) carried by the plurality of PUCCHs on the first PUCCH resource, and send the multiplexed UCI in the first time unit on the second carrier;

rule 2: send multiple PUCCHs in the first time unit on the second carrier in a time division multiplexing (TDM) manner, wherein each PUCCH of the multiple PUCCHs corresponds to one of the plurality of PUCCHs;

rule 3: select part of the plurality of PUCCHs, discard part of the plurality of PUCCHs, and send a PUCCH corresponding to the selected part of the plurality of PUCCHs in the first time unit on the second carrier by using the rule 1 or the rule 2;

rule 4: determine as an error schedule or configuration.

When the rule 1 is used, the sending unit is further specifically configured to perform one of following:

first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;

second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

When the first method is used, a frequency domain resource of the first PUCCH resource is same as a frequency domain resource of the second PUCCH resource, and/or a code domain resource of the first PUCCH resource is same as a code domain resource of the second PUCCH resource.

When the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier.

When determining that the first PUCCH resource is the first-type PUCCH resource, the sending unit is specifically configured to:

obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;

multiplexing, on the first PUCCH resource based on the minimum quantity of RBs, the UCI carried by the plurality of PUCCHs, and sending the multiplexed UCI in the first time unit on the second carrier.

The carrier switching transmission apparatus further includes:

a first processing unit, configured to when the third method is used, if a quantity of bits of the UCI needing to be transmitted on the first PUCCH resource is insufficient to use a predetermined threshold of using encoding transmission, supplement information in the UCI until the predetermined threshold of using the encoding transmission is reached.-

When using the fourth method, the sending unit is specifically configured to:
  when the PUCCH resource set includes only one first-type PUCCH resource and one second-type PUCCH resource, determining a PUCCH resource from the one first-type PUCCH resource and the one second-type PUCCH resource as the first PUCCH resource according to the quantity of bits of the UCI; or
  when the PUCCH resource set includes a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources includes a plurality of PUCCH resources, selecting a PUCCH resource, satisfying a first preset condition, from the determined type of PUCCH resources as the first PUCCH resource;
  wherein the first preset condition is one of following:
    a starting position does not exceed a starting position of any PUCCH resource corresponding to the plurality of PUCCHs on the first carrier;
    a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;
    processing time requirement of UCI transmission is satisfied.

If a quantity of PUCCH resources satisfying the first preset condition is multiple, a PUCCH resource is determined as the first PUCCH resource according to a preset selection rule, wherein the preset selection rule is at least one of following:
  selecting a PUCCH resource with an earliest starting symbol;
  selecting a PUCCH resource occupying a least quantity of symbols;
  selecting a PUCCH resource which meets a minimum carrying capacity;
  selecting a PUCCH resource with a smallest PUCCH resource index.

When the rule 2 is used, the carrier switching transmission apparatus further includes:
  a second processing unit, configured to determine a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

The apparatus further includes at least one of:
  when a same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;
  for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;
  for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, carried on the one PUCCH, in the first time unit on the second carrier by using the third PUCCH resource, wherein the third-type PUCCH formats are PUCCH formats having a symbol quantity greater than or equal to the second threshold;
  for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

To achieve the above objective, a network-side device is further provided. The network-side device includes:
  a memory, a transceiver, and a processor, wherein the memory is configured to store a computer program, the transceiver is configured to transmit and receive data under control of the processor, the processor is configured to read the computer program in the memory and perform the following operations:
  when a plurality of physical uplink control channels (PUCCHs) transmitted on a first carrier needs to do carrier switching and all of the plurality of PUCCHs are determined to be transmitted in a first time unit on a second carrier after the carrier switching, receiving one or more PUCCHs after the carrier switching in the first time unit on the second carrier according to a first rule, wherein the plurality of PUCCHs does not overlap in a time domain on the first carrier.

The processor is configured to read the computer program in the memory and perform the following operations:
  rule 1: determining a first PUCCH resource in the first time unit on the second carrier, and receiving the one or more PUCCHs by using the first PUCCH resource in the first time unit on the second carrier, wherein the first PUCCH resource is used to carry simultaneously Uplink Control Information (UCI) carried by the plurality of PUCCHs;
  rule 2: receiving multiple PUCCHs in the first time unit on the second carrier in a time division multiplexing (TDM) manner, wherein each PUCCH of the multiple PUCCHs corresponds to one of the plurality of PUCCHs;
  rule 3: selecting part of the plurality of PUCCHs, discarding part of the plurality of PUCCHs, and receiving a PUCCH corresponding to the selected part of the plurality of PUCCHs in the first time unit on the second carrier by using the rule 1 or the rule 2;

rule 4: determining as an error schedule or configuration.

When the rule 1 is used, the processor is configured to read the computer program in the memory and perform the following operations:

first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;

second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

When the first method is used, a frequency domain resource of the first PUCCH resource is same as a frequency domain resource of the second PUCCH resource, and/or a code domain resource of the first PUCCH resource is same as a code domain resource of the second PUCCH resource.

When the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier.

When determining that the first PUCCH resource is the first-type PUCCH resource, the processor is configured to read the computer program in the memory and perform the following operations:

obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;

receiving the one or more PUCCHs through the first PUCCH resource in the first time unit on the second carrier based on the minimum quantity of RBs, wherein the first PUCCH resource simultaneously carries UCI carried by the plurality of PUCCHs.

The processor is configured to read the computer program in the memory and perform the following operations:

when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached.

When the fourth method is adopted, the processor is configured to read the computer program in the memory and perform the following operations:

when the PUCCH resource set includes only one first-type PUCCH resource and one second-type PUCCH resource, determining a PUCCH resource from the one first-type PUCCH resource and the one second-type PUCCH resource as the first PUCCH resource according to the quantity of bits of the UCI; or when the PUCCH resource set includes a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources includes a plurality of PUCCH resources, selecting a PUCCH resource, satisfying a first preset condition, from the determined type of PUCCH resources as the first PUCCH resource;

wherein the first preset condition is one of following:

a starting position does not exceed a starting position of any PUCCH resource corresponding to the plurality of PUCCHs on the first carrier;

a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;

processing time requirement of UCI transmission is satisfied.

If a quantity of PUCCH resources satisfying the first preset condition is multiple, a PUCCH resource is determined as the first PUCCH resource according to a preset selection rule, wherein the preset selection rule is at least one of following:

selecting a PUCCH resource with an earliest starting symbol;

selecting a PUCCH resource occupying a least quantity of symbols;

selecting a PUCCH resource which meets a minimum carrying capacity;

selecting a PUCCH resource with a smallest PUCCH resource index.

When the rule 2 is used, the processor is configured to read the computer program in the memory and perform the following operations:

determining a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

The processor is configured to read the computer program in the memory and perform the following operations:

when a same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;

for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;

for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, carried on the one PUCCH, in the first time unit on the second carrier by using the third PUCCH resource, wherein the third-type PUCCH formats are PUCCH formats having a symbol quantity greater than or equal to the second threshold;

for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

To achieve the above objective, a carrier switching transmission apparatus is further provided. The apparatus includes:

a receiving unit, configured to when a plurality of physical uplink control channels (PUCCHs) transmitted on a first carrier needs to do carrier switching and all of the plurality of PUCCHs are determined to be transmitted in a first time unit on a second carrier after the carrier switching, receive one or more PUCCHs after the carrier switching in the first time unit on the second carrier according to a first rule, wherein the plurality of PUCCHs does not overlap in a time domain on the first carrier.

The receiving unit is specifically configured to:

rule 1: determine a first PUCCH resource in the first time unit on the second carrier, and receive the one or more PUCCHs by using the first PUCCH resource in the first time unit on the second carrier, wherein the first PUCCH resource is used to carry simultaneously Uplink Control Information (UCI) carried by the plurality of PUCCHs;

rule 2: receive multiple PUCCHs in the first time unit on the second carrier in a time division multiplexing (TDM) manner, wherein each PUCCH of the multiple PUCCHs corresponds to one of the plurality of PUCCHs;

rule 3: select part of the plurality of PUCCHs, discard part of the plurality of PUCCHs, and receive a PUCCH corresponding to the selected part of the plurality of PUCCHs in the first time unit on the second carrier by using the rule 1 or the rule 2; rule 4: determining as an error schedule or configuration.

When the rule 1 is used, the receiving unit is specifically configured to:

first method: perform UCI multiplexing on the first carrier according to a case with assumption that there is overlapping among the plurality of PUCCHs in the time domain, and obtain a second PUCCH resource for multiplexing transmission of the UCI on the first carrier, and determine a first PUCCH resource in the first time unit on the second carrier according to a start symbol and a quantity of symbols of the second PUCCH resource;

second method: if there are one or more PUCCHs corresponding to one or more physical downlink control channels (PDCCHs) in the plurality of PUCCHs, determine, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determine a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: perform UCI multiplexing according to assumption that there is time-domain overlapping among the plurality of PUCCHs, to obtain a bit quantity of the multiplexed UCI, and determine one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

When the first method is used, a frequency domain resource of the first PUCCH resource is same as a frequency domain resource of the second PUCCH resource, and/or a code domain resource of the first PUCCH resource is same as a code domain resource of the second PUCCH resource.

When the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier.

When determining that the first PUCCH resource is the first-type PUCCH resource, the receiving unit is specifically configured to:
  obtain a minimum quantity of resource blocks (RBs) actually occupied by the first PUCCH resource, according to a quantity of bits of UCI needing to be transmitted on the first PUCCH resource and a preset transmission parameter of the first PUCCH resource;
  receive the one or more PUCCHs through the first PUCCH resource in the first time unit on the second carrier based on the minimum quantity of RBs, wherein the first PUCCH resource simultaneously carries UCI carried by the plurality of PUCCHs.

The carrier switching transmission apparatus further includes:
  a third processing unit, configured to when the third method is used, if a quantity of bits of the UCI needing to be transmitted on the first PUCCH resource is insufficient to use a predetermined threshold of using encoding transmission, supplement information in the UCI until the predetermined threshold of using the encoding transmission is reached.

When the fourth method is used, the receiving unit is specifically configured to:
  when the PUCCH resource set includes only one first-type PUCCH resource and one second-type PUCCH resource, determine a PUCCH resource from the one first-type PUCCH resource and the one second-type PUCCH resource as the first PUCCH resource according to the quantity of bits of the UCI; or
  when the PUCCH resource set includes a plurality of first-type PUCCH resources and/or a plurality of second-type PUCCH resources, determine a type of PUCCH resources from the plurality of first-type PUCCH resources and the plurality of second-type PUCCH resources according to the quantity of bits of the UCI; when the determined type of PUCCH resources includes a plurality of PUCCH resources, select a PUCCH resource, satisfying a first preset condition, from the determined type of PUCCH resources as the first PUCCH resource;
  wherein the first preset condition is one of following:
  a starting position does not exceed a starting position of any PUCCH resource corresponding to the plurality of PUCCHs on the first carrier;
  a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;
  processing time requirement of UCI transmission is satisfied.

If a quantity of PUCCH resources satisfying the first preset condition is multiple, a PUCCH resource is determined as the first PUCCH resource according to a preset selection rule, wherein the preset selection rule is at least one of following:
  selecting a PUCCH resource with an earliest starting symbol;
  selecting a PUCCH resource occupying a least quantity of symbols;
  selecting a PUCCH resource which meets a minimum carrying capacity;
  selecting a PUCCH resource with a smallest PUCCH resource index.

When the rule 2 is used, the carrier switching transmission apparatus further includes:
  a fourth unit, configured to determine a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

The apparatus further includes at least one of following:
  when a same symbol on the second carrier overlaps with symbols corresponding to at least two PUCCHs in the plurality of PUCCHs on the first carrier, determine that the symbol on the second carrier only belongs to a third PUCCH resource corresponding to one PUCCH of the at least two PUCCHs on the second carrier;
  for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;
  for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, carried on the one PUCCH, in the first time unit on the second carrier by using the third PUCCH resource, wherein the third-type PUCCH formats are PUCCH formats having a symbol quantity greater than or equal to the second threshold;
  for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

To achieve the above objective, a processor-readable storage medium is further provided, wherein the processor-readable storage medium stores a computer program, and the computer program is configured to cause a processor to execute steps of the carrier switching transmission method provided above.

The above technical solution of the present disclosure has at least the following beneficial effects:

in the above technical solutions of the embodiments of the present disclosure, a plurality of physical uplink control channels (PUCCHs) transmitted on a first carrier needs to do carrier switching and all of the plurality of PUCCHs are determined to be transmitted in a first time unit on a second carrier after the carrier switching, the terminal sends one or more PUCCHs after the carrier switching in the first time unit on the second carrier according to a first rule, wherein the plurality of PUCCHs does not overlap in a time domain on the first carrier, so that PUCCH transmission can be realized in a PUCCH carrier switching manner.

BRIEF DESCRIPTION OF THE DRAWINGS

In order to more clearly illustrate the technical solutions of the embodiments of the present disclosure, the accompanying drawings that need to be used in the description of the embodiments of the present disclosure are briefly described below. It is obvious that the drawings in the following description are merely some embodiments of the present disclosure, and other drawings may also be obtained by those skilled in the art according to these drawings.

FIG. 1 is a first schematic flowchart of a carrier switching transmission method according to embodiments of the present disclosure;

FIG. 2 is a second schematic flowchart of a carrier switching transmission method according to the embodiments of the present disclosure;

FIG. 3 is a first schematic diagram of an example of determining a PUCCH resource on a second carrier in a carrier switching transmission method according to the embodiments of the present disclosure;

DETAILED DESCRIPTION

Figure 4:
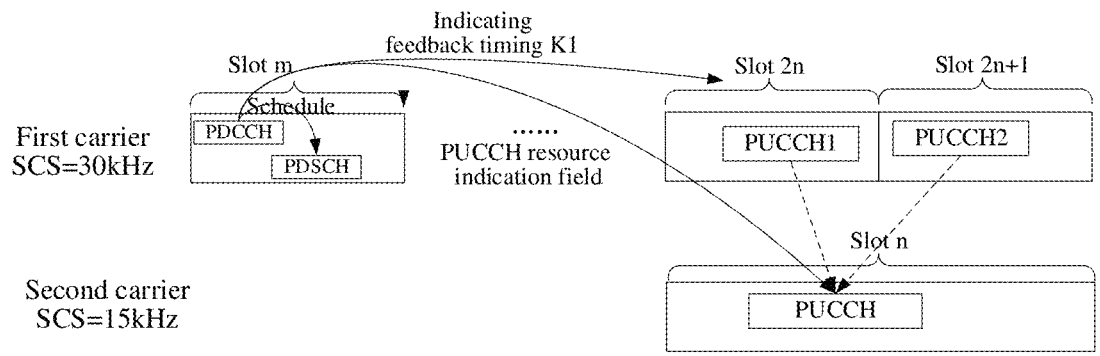
FIG. 4 is a second schematic diagram of an example of determining a PUCCH resource on a second carrier in a carrier switching transmission method according to the embodiments of the present disclosure.

In the embodiments of the present disclosure, the term "and/or" describes an association relationship of associated objects, and indicates that there may be three relationships, for example, A and/or B may indicate three cases that A exists alone, A and B exist at the same time, and B exists alone. The character "/" generally indicates that the associated objects have "or" relationship.

A term "a plurality of" in the embodiments of the present disclosure means two or more, and the other quantifiers are similar to each other.

The technical solutions in the embodiments of the present disclosure will be clearly and completely described below with reference to the accompanying drawings in the embodiments of the present disclosure. It is obvious that the described embodiments are merely some, rather than all, of the embodiments of the present disclosure. All other embodiments obtained by a person of ordinary skill in the art based on the embodiments of the present disclosure without creative efforts shall fall within the protection scope of the present disclosure.

Uplink Control Information (UCI) includes information such as Hybrid Automatic Repeat reQuest-ACKnowledgment (HARQ-ACK), Channel State Information (CSI), Scheduling Request (SR), etc.

The HARQ-ACK generally refers to ACK or NACK, and is used to feed back a Physical Downlink Shared Channel (PDSCH) or a PDCCH (also referred to as SPS PDSCH release) indicating a Semi-Persistent Scheduling (SPS) resource release, and inform a base station whether the Physical Downlink Control Channel (PDCCH) indicating the SPS PDSCH release or the PDSCH is correctly received.

The CSI is used to feed back a downlink channel quality, thereby helping the base station to better perform downlink scheduling. For example, a Modulation and Coding Scheme (MCS) is selected according to CSI, and an appropriate Resource Block (RB) resource and the like are configured according to CSI.

The SR is used to request, from a base station, a Physical Uplink Shared Channel (PUSCH) transmission resource carrying an uplink service, when the terminal has the uplink service needing to be transmitted. UCI is transmitted on the PUCCH, and the PUCCH is always transmitted on a fixed carrier.

In a Carrier Aggregation (CA) scenario, a PUCCH is transmitted on a PCC (or PCell), and when a PUCCH is configured in the CA scenario to be transmitted on an SCC (or SCell), aggregated carriers may be divided into two PUCCH carrier groups, one specified carrier of transmitting a PUCCH exists in each PUCCH carrier group, a carrier group including a Primary Component Carrier (PCC) is a primary PUCCH carrier group, and the PUCCH is transmitted on the PCC; all carriers in the secondary PUCCH carrier group are Secondary Component Carriers (SCC), and a high-layer signaling configures one of the SCCs to transmit a PUCCH, the SCC is referred to as a PUCCH SCell, and HARQ-ACKs of downlink transmissions on all carriers in each carrier group are transmitted in a PUCCH on a specified carrier. In a Dual-connective (DC) scenario, there are two carrier groups, i.e., a Master Carrier Group (MCG) and a Secondary Carrier Group (SCG), and a PUCCH is transmitted on a specified carrier in each carrier group, wherein the MCG includes a PCC, and the PUCCH is transmitted on the PCC; all CCs in the SCG are SCCs, and the PUCCH is transmitted on one preconfigured CC (or referred to as PSCell) of the SCCs.

Flexible timing relationship is supported in a fifth generation new radio access technology RAT (5G NR). Downlink transmission with dynamic scheduling (i.e. transmission scheduled by the PDCCH or Downlink Control Information (DCI)) includes a PDSCH scheduled by a PDCCH, a Type 3 HARQ-ACK codebook transmission triggered by the DCI, and a PDCCH itself requiring HARQ-ACK. For example, the PDCCH requiring the HARQ-ACK includes the PDCCH indicating the downlink SPS resource release, a PDCCH indicating SCell dormancy (sleep), etc. A slot or sub-slot where HARQ-ACK transmission is located may be determined based on a feedback timing indication field in a corresponding PDCCH or DCI (PDCCH and DCI may be considered to be equivalent, DCI is a specific transmission format of a PDCCH, and a PDCCH is a transmission channel of DCI).

Taking a PDSCH as an example, the PDCCH carrying scheduling information of the PDSCH indicates scheduling timing relationship (Scheduling Timing, i.e., K0) between the PDSCH and the PDCCH and the feedback timing relationship (HARQ-ACK Timing, i.e., K1) between the PDSCH and the corresponding HARQ-ACK. Specifically, a time-domain resource allocation indication field in the DCI format used by the PDCCH indicates a slot offset K0 between a slot of the PDSCH and the slot of the DCI; a PDSCH to HARQ-ACK feedback timing indication field in the DCI format indicates the number K1 of slots between the end of the PDSCH and the start of the HARQ-ACK, That is, when uplink and downlink subcarrier spacings (SCS) are the same, HARQ-ACK of the PDSCH transmitted in a slot n is transmitted in a slot n+K1.

A full set of K1 is {0, 1, 2, 3, 4, 5, 6, 7, 8, 9, 10, 11, 12, 13, 14, 15}, usually at most 8 values of which are configured to the terminal. In Rel-15, a unit of a value of K1 is a slot, that is, K1=1 represents an interval of 1 slot. In Rel-16, a unit of the value of K1 may be a slot or a sub-slot, where the sub-slot may be pre-configured to be a length of two symbols (i.e. there are 7 sub-slots sequentially in one slot), or a length of seven symbols (i.e. there are two sub-slots sequentially in one slot), etc. Whether there is a feedback timing indication field in the DCI may be obtained according to whether the indication bit quantity configured by the high-layer signaling is greater than 0, or may be determined according to the number of elements in the candidate value set of the feedback timing K1 configured by the high layer signaling. When the number of elements is greater than one, the number of indicated bits is determined according to the number of elements (for example, ceil (log 2N), N is the number of elements, and ceil ( ) is a rounding up function); when the number of elements is only one element, there is no indication field in the DCI, and this value is directly used to determine the feedback timing.

A semi-static UCI may be such as CSI, SR, and HARQ-ACK (SPS HARQ-ACK, for short) corresponding to a SPS PDSCH. A slot or sub-slot where PUCCH transmission carrying the semi-static UCI is located is semi-statically determined, and is called semi-static feedback timing. For example, the CSI and the SR are is used to determine a slot where each transmission occasion is located and a symbol position of the transmission occasion in the slot according to the period and the offset value configured by the high-layer signaling, and, so that the PUCCH resource configured by the high-layer signaling is used for periodic transmission in the corresponding slot and the corresponding symbol position. The SPS HARQ-ACK may be used to determine the HARQ-ACK feedback position according to the K1 value indicated by the feedback timing indication field in the PDCCH indicating activation of the SPS PDSCH (i.e. in the slot or sub-slot). Of course, if the feedback timing indication field does not exist in the PDCCH indicating the activation of the SPS PDSCH, the HARQ-ACK feedback position is determined according to a K1 value configured by the high-layer signaling.

The PUCCH resource carrying the CSI or SR is one PUCCH resource configured for each CSI report or each SR configuration by high-layer signaling. One or more PUCCH resource sets may be configured for carrying HARQ-ACK of downlink transmission with the dynamic scheduling. If only one PUCCH resource set is configured, the PUCCH resource carrying the HARQ-ACK of the downlink transmission with the dynamic scheduling may be one resource selected from a plurality of resources in the resource set according to the PUCCH resource indication field in the scheduling PDCCH; and if one resource set includes more than 8 resources, then one resource is selected from the plurality of resources by combining the Control Channel Element (CCE) information of the PDCCH and the PUCCH resource indication field collectively. If a plurality of PUCCH resource sets is configured, different PUCCH resource sets correspond to different numbers of UCI transmission bits, one PUCCH resource set is selected according to the UCI bit number carried by the PUCCH, and one resource is selected from a plurality of resources in the selected PUCCH resource set according to the PUCCH resource indication field in the scheduling PDCCH. If only one PUCCH resource exists in one resource set, a PUCCH resource indication field may not exist in the PDCCH, and the PUCCH resource may be directly used for transmission.

The NR may also support a flexible uplink and downlink slot ratio; on one hand, which of a plurality of slots included in a time period are downlink slots, which of the plurality of slots are uplink slots, and which of the plurality of slots are mixed slots that contain both uplink transmission and downlink transmission may be configured by means of a high-layer signaling. For example, the high-layer signaling may configure the start point of an entire-downlink slot, the number of consecutive entire-downlink slots, the number of downlink symbols in a slot next to the entire-downlink slot, the number of uplink symbols in a slot before the first entire-uplink slot, the number and the end position of consecutive entire-uplink slots, wherein the symbol positions not indicating uplink or downlink symbols are considered to be flexible symbols, and the flexible symbols can be dynamically used as downlink transmission or uplink transmission. In addition, the uplink to downlink ratio may also be changed by means of dynamic indication, for example, division of uplink and downlink symbols in each slot of one or more consecutive slots is informed by periodically sending a DCI indicating a slot format (SFI), so as to adjust the number of uplink and downlink symbols in each slot.

One of two metrics of URLLC is highly reliable transmission, e.g., performance of a Block Error Rate (BLER) lower than $10^{-5}$ or even lower; another of the two metrics is low latency, e.g., air-interface unidirectional transmission time does not exceed 0.5 milliseconds (ms) or 1 ms, etc. A UCI transmission delay of the URLLC affects the transmission delay of the URLLC service, for example, a delay of HARQ-ACK feedback affects retransmission of the PDSCH, and the delay of the CSI feedback affects scheduling of the PDSCH, thereby affecting the delay of a downlink service; and a delay of the SR affects the delay of the PUSCH, thereby affecting the delay of the uplink service. When the PUCCH can only be transmitted on the configured PCell or PUCCH SCell or PSCell, if there is no available uplink resource for HARQ-ACK transmission at a feedback time instant determined according to the minimum K1 value determined in accordance with a processing delay of the PDSCH, the PUCCH cannot be transmitted, and it is necessary to delay the transmission of the HARQ-ACK transmission to a subsequent time instant at which there is an available uplink resource, by changing the K1 value or the like. As a result, the delay of PUCCH transmission will be increased. At present, in order to reduce a PUCCH transmission delay, it is proposed that a carrier of PUCCH transmission may be switched, but how to specifically perform the PUCCH transmission by using a PUCCH carrier switching method is not clear.

In order to solve the problem of how to specifically perform the PUCCH transmission by using the PUCCH carrier switching method, the embodiments of the present disclosure provide a carrier switching transmission method, a carrier switching transmission apparatus, a terminal, and a network-side device, wherein the method and the apparatus are based on the same application concept, and the implementation of the apparatus and the method may refer to each other, and details are not described herein again when describing for the second time.

FIG. 1 is a schematic flowchart of a carrier switching transmission method according to the embodiments of the present disclosure. The method includes:

Step 101: when a plurality of physical uplink control channels (PUCCHs) transmitted on a first carrier needs to do carrier switching, and each of the plurality of PUCCHs is determined to be transmitted in a first time unit on a second carrier after the carrier switching, sending PUCCHs after the carrier switching in the first time unit on the second carrier by the terminal according to a first rule, wherein the plurality of PUCCHs does not overlap in a time domain on the first carrier.

That is, when it is determined that the plurality of PUCCHs transmitted on the first carrier need to be switched to the same time unit (i.e. the first time unit) on the second carrier for transmission, the terminal sends the PUCCHs in the first time unit on the second carrier according to the first rule after the switching.

For example, there are three PUCCHs on the first carrier which need carrier switching, but it is determined that there are two PUCCHs, of the three PUCCHs, to be transmitted in the first time unit on the second carrier after the carrier switching, and the terminal sends the PUCCHs after the switching in the first time unit on the second carrier according to the first rule. Here, the PUCCHs after the switching are related to the two PUCCHs of the three PUCCHs, that is, the method of the present disclosure may be used to perform carrier switching processing on the two PUCCHs.

Here, transmitting the PUCCHs on the first carrier specifically refer to transmitting the UCI carried by the PUCCHs on the first carrier.

It should be noted that the SCS of the first carrier and the SCS of the second carrier may be the same or different.

The plurality of PUCCHs may be transmitted in different time units on the first carrier, or may be transmitted in the same time unit.

The time units of the first carrier and the second carrier may have the same unit or different units. The units may appear as one of a slot and a sub-slot, and the sub-slots may have different symbol lengths (for example, a sub-slot with a length of 2 symbols, or a sub-slot with a length of 7 symbols, etc.).

According to the carrier switching transmission method of the embodiments of the present disclosure, a plurality of physical uplink control channels (PUCCHs) transmitted on a first carrier need carrier switching, and it is determined that the plurality of PUCCHs are transmitted in a first time unit on a second carrier after carrier switching, and the terminal sends the PUCCHs after the switching in a first time unit on the second carrier according to the first rule, wherein the plurality of PUCCHs on the first carrier do not overlap in the time domain, so that PUCCH transmission can be realized through the carrier switching of a PUCCH.

In an optional implementation, in step 101, sending the PUCCHs in the first time unit on the second carrier according to the first rule by the terminal after the switching includes one of the following manners 1-4.

Rule 1: determining a first PUCCH resource in the first time unit on the second carrier, multiplexing uplink control information (UCI) carried by the plurality of PUCCHs on the first PUCCH resource, and sending the uplink control information UCI in the first time unit on the second carrier; wherein when the rule 1 is used, the first PUCCH resource is determined in the first time unit on the second carrier in one of following methods.

First method: performing UCI multiplexing on the first carrier according to a case with assumption that there is overlapping among the plurality of PUCCHs in the time domain, and obtaining a second PUCCH resource for multiplexing transmission of the UCI on the first carrier, and determining a first PUCCH resource in a first time unit on the second carrier according to the start symbol and the number of symbols of the second PUCCH; it should be noted that UCI multiplexing is performed according to a case with the assumption that there is overlapping of the plurality of PUCCHs, and during transmission, a UCI multiplexing transmission mechanism that has been determined in NR Rel-15 and Rel-16 may be used, cascaded transmission may exist or some information may be discarded.

Optionally, when adopting the first method, the frequency domain resource of the first PUCCH resource is the same as the frequency domain resource of the second PUCCH resource, and/or the code domain resource of the first PUCCH resource is the same as the code domain resource of the second PUCCH resource.

Here, the code domain resource may include a cyclic shift, an orthogonal sequence, or the like. The purpose of using the above configuration is to ensure that the RB will not exceed the bandwidth range of the second carrier according to the foregoing method, or the PUCCHs are only transmitted in the RBs included in the bandwidth range if exceeding the bandwidth range.

Optionally, when the first method is used, the time unit of transmitting the PUCCH on the first carrier and the time unit of transmitting the PUCCH on the second carrier have the same unit, or the time unit of transmitting the PUCCH on the first carrier is less than or equal to the time unit of transmitting the PUCCH on the second carrier.

Here, the unit of the time unit of transmitting the PUCCH on the first carrier and the unit of the time unit of transmitting the PUCCH on the second carrier are the same, for example, are slots, or are sub-slots of the same length.

The time unit of transmitting the PUCCH on the first carrier is less than or equal to the time unit of transmitting the PUCCH on the second carrier. For example, the time unit of transmitting the PUCCH on the first carrier is a sub-slot with a length of 7 symbols, and the time unit of transmitting the PUCCH on the second carrier may be a slot or be a sub-slot with a length of 7 symbols, but cannot be a sub-slot with a length of 2 symbols.

A time unit of transmission may be one of a slot and a sub-slot, and the sub-slot may have different lengths, such as a 2-symbol sub-slot or a 7-symbol sub-slot. Here, if the type of the time unit of PUCCH transmission is not configured on the second carrier, it is determined that transmission is performed according to a time unit identical to the time unit of PUCCH transmission on the first carrier or according to a pre-agreed time unit of PUCCH transmission.

The first PUCCH resource in a first time unit on the second carrier is determined according to the start symbol and the number of symbols of the second PUCCH, that is, in the first time unit on the second carrier, a time domain position of one PUCCH resource is determined according to the start symbol and the number of symbols corresponding to the second PUCCH.

Second method: if there is the PUCCH corresponding to the physical downlink control channel (PDCCH) in the plurality of PUCCHs, determining, according to a PUCCH resource indication field in a first PDCCH, one PUCCH resource as the first PUCCH resource from a PUCCH resource set pre-configured on the second carrier (the resource set here is configured to a resource set used for transmission of a PUCCH having a corresponding PDCCH), wherein the first PDCCH is the last PDCCH in all PDCCHs corresponding to the plurality of PUCCHs, or the last PDCCH in PDCCHs corresponding to the last PUCCH of the plurality of PUCCHs.

It should be noted that there is a PUCCH corresponding to a PDCCH in the plurality of PUCCHs, the PUCCH carries at least the HARQ-ACK, and the HARQ-ACK is the HARQ-ACK of the PDSCH scheduled by the PDCCH, or is the HARQ-ACK of the PDCCH indicating the SPS PDSCH resource release, or is the HARQ-ACK of the PDCCH indicating the SCell Dormancy, or is the HARQ-ACK corresponding to the Type 3 codebook triggered by the PDCCH, all of these PDCCHs are the PDCCHs corresponding to the PUCCH.

Determining, according to a PUCCH resource indication field in the first PDCCH, one PUCCH resource from a PUCCH resource set preconfigured on the second carrier as the first PUCCH resource includes:
  if there are a plurality of PUCCH resource sets and different PUCCH resource sets correspond to different numbers of UCI bit, selecting one PUCCH resource set from the plurality of PUCCH resource sets according to the number of corresponding UCI bits after UCI multiplexing of the plurality of PUCCHs;
  determining a PUCCH resource as the first PUCCH resource in the selected PUCCH resource set according to the PUCCH resource indication field in the first PDCCH.

Third method: determining a first-type PUCCH resource preconfigured on the second carrier as the first PUCCH resource, wherein there is one first-type PUCCH resource pre-configured on the second carrier, and the first-type PUCCH resource is a PUCCH resource corresponding to a first type of preset PUCCH format, or a PUCCH resource having a carrying capacity greater than a preset threshold.

Here, a first-type PUCCH resource is pre-configured on the second carrier by means of a high-layer signaling, so that one PUCCH resource may be used in consideration of any UCI bit number carried on the PUCCH requiring carrier switching can be considered by means of the PUCCH resource. This PUCCH resource may be used for any UCI and any UCI bit number. In order to enable both large-bit transmission and small-bit transmission to use this resource, a bearer capacity of this resource needs to be large enough, for example, the number of configured RB resources is larger, so that one PUCCH resource can be used to support transmission of UCI with any UCI bit number, such as 1-bit transmission or 2-bit transmission or more, for example 3-bit transmission or even 100-bit transmission can be supported. In order to reduce the transmission overhead, when the PUCCH resource is used for transmission, the number of RBs (RBmin) actually occupied by the PUCCH resource may be determined according to the UCI bits carried by the PUCCH resource, and the PUCCH resource is used for transmission according to the number of RBs actually occupied, so as to reduce the resource overhead.

In addition, in this embodiment, the method further includes:
  if the number of bits of the UCI to be transmitted on the first PUCCH resource is less than a predetermined threshold, supplementing information in the UCI until the predetermined threshold is reached.

In this way, the UCI is transmitted by using the PUCCH resource in an encoding manner, considering that the encoding manner is used for the UCI bit number not less than the predetermined threshold, the predetermined threshold may be 3 bits, so if the bit number of UCI that needs to be transmitted on the first PUCCH resource is less than the predetermined threshold based on the pre-configured predetermined threshold, the information is supplemented in the UCI until the predetermined threshold is reached, so that the UCI is transmitted in an encoding manner.

Supplementing the information in the UCI may be adding bits at the tail (or the head) of the UCI. Moreover, the added bits may be placeholder bits, or repeating original information bits of the UCI, etc.

Fourth method: performing UCI multiplexing according to assumption that there is time-domain overlapping among the plurality of PUCCHs, to obtain the bit number of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

Here, one or more PUCCH resource sets are pre-configured on the second carrier by means of high-layer signaling.

It should be noted that, in the above third method and the fourth method, optionally, the first type of preset PUCCH format is one of PUCCH formats 2, 3 and 4. Optionally, the preset threshold is 2 bits.

In the fourth method, optionally, the second type of preset PUCCH format is one of PUCCH formats 0 and 1.

It should be noted that the second-type PUCCH resources may always be configured according to resources needed for transmission of 2-bit UCI (for example, when configuring the PUCCH format 0, it is always assumed that HARQ-ACK transmission using this PUCCH format always occupy 4 cyclic shifts corresponding to 4 combination states of 2-bit HARQ-ACK (i.e., {ACK, ACK}, {NACK, NACK}, {ACK, NACK}, {NACK, ACK}), if only one-bit UCI is transmitted, the one-bit UCI may be supplemented to 2-bit UCI, such as one-bit NACK is supplemented into the UCI, and one cyclic shift of the four cyclic shifts may be selected according to the correspondence between the four cyclic shifts and the HARQ-ACK states of the 2 bits, the selected cyclic shift is used for transmission), or the second-type PUCCH resources may always be configured according to resources needed for transmission of 1-bit UCI, then if the UCI is 2 bits, then it is necessary to combine the 2-bit UCI to obtain 1-bit UCI for transmission.

In an optional implementation, where it is determined that the first PUCCH resource is the first-type PUCCH resource, the method further includes:
  obtaining the minimum number of resource blocks (RBs) actually occupied by the first PUCCH resource, according to the number of UCI bits that need to be transmitted on the first PUCCH resource and a preset transmission parameter of the first PUCCH resource;
  multiplexing UCIs carried by the plurality of PUCCHs on the first PUCCH resource based on the minimum number of RBs, and sending the UCIs in the first time unit on the second carrier.

Optionally, the preset transmission parameter is a parameter that can affect a carrying capacity of a resource, and includes, but is not limited to, a code rate, a time domain symbol number, a DMRS position, an orthogonal sequence, and a modulation level.

In this implementation, the resource overhead can be reduced.

As an optional implementation, the method in the embodiments of the present disclosure may further include:
  when the third method is used, if the number of bits of the UCI that needs to be transmitted on the first PUCCH resource is insufficient to use the predetermined threshold for using encoding transmission, supplementing information in the UCI until the predetermined threshold for using the encoding transmission is reached.

Optionally, the predetermined threshold is 3. When the first PUCCH resource is the first-type PUCCH resource, the UCI is transmitted in an encoding manner. The encoding manner is directed to a UCI bit number that is not less than the predetermined threshold, and therefore, for the UCI bit number that is less than the predetermined threshold, the predetermined threshold may be reached by supplementing bits. Specifically, the manner of supplementing the bits may be adding the bits at the tail or the header of the UCI, where the added bits may be placeholder bits, or repeating original information bits of the UCI, etc.

In an optional implementation, when the fourth method is adopted, determining one first PUCCH resource includes:
  when the PUCCH resource set includes only one first-type PUCCH resource and one second-type PUCCH resource, determining a PUCCH resource in the one first-type PUCCH resource and the one second-type PUCCH resource as the first PUCCH resource according to the UCI bit number.

The determining the first PUCCH resource is starting from a perspective of configuring a small number of resources, wherein one PUCCH resource may be selected from the unique one PUCCH resource supporting large-capacity transmission and the unique one PUCCH resource supporting small-capacity transmission as the first PUCCH resource, directly according to the UCI bit number. The large-capacity transmission of the PUCCH resource may be configured with a relatively large capacity, for example, configured with more RBs, so that transmission of UCI having a relatively large range of bits (such as more than 2 bits) may be supported by using one PUCCH resource, for example, 3-bit UCI may be transmitted using this PUCCH resource, and UCI of 100 bits may also be transmitted using this PUCCH resource. In order to reduce the transmission overhead, when the PUCCH resource is used for transmission, the number of RBs (RBmin) actually occupied by the PUCCH resource may be determined according to the UCI bits carried by the PUCCH, and the PUCCH resource is used for transmission according to the number of RBs actually occupied, so as to reduce the resource overhead.

Optionally, when the PUCCH resource set includes a plurality of first-type PUCCH resources and/or a plurality of second-type PUCCH resources, a type of PUCCH resources is determined in the first-type PUCCH resources and the second-type PUCCH resources according to the number of bits of the UCI; when the determined type of PUCCH resources includes a plurality of PUCCH resources, a PUCCH resource satisfying a first preset condition is selected from the determined type of PUCCH resources as the first PUCCH resource.

The first preset condition is one of the following:
  a starting position does not exceed a starting position of PUCCH resources corresponding to the plurality of PUCCHs on the first carrier;
  a starting position does not exceed a starting position of a second PUCCH resource which is obtained by multiplexing the UCIs on the first carrier according to the assumption that there is time-domain overlapping among the plurality of PUCCHs and which is used for transmitting the multiplexed UCIs on the first carrier and;
  processing time requirement of the UCI transmission is satisfied.

The determining the first PUCCH resource is starting from a perspective of flexibility and consideration of a processing delay, a plurality of large-capacity PUCCH resources (i.e. first-type PUCCH resources) may be configured, and a plurality of small-capacity PUCCH resources (i.e. second-type PUCCH resources) may also be configured; optionally, a plurality of large-capacity PUCCH resources may also be configured, but only one small-capacity PUCCH resource is configured, or a plurality of small-capacity PUCCH resources may also be configured, but only one large-capacity PUCCH resource is configured. When there are a plurality of large-capacity PUCCH resources, the numbers of UCI bits that can be carried by different PUCCH resources are different, and a resource capable of carrying these UCI may be selected according to the number of UCI bits that need to be transmitted.

Further, if the number of PUCCH resources satisfying the first preset condition is multiple, a PUCCH resource is determined as the first PUCCH resource according to a preset selection rule.

The preset selection rule is at least one of following:
  selecting one PUCCH resource with the earliest starting symbol;
  selecting one PUCCH resource occupying the least number of symbols;
  selecting one PUCCH resource which meets the minimum of the carrying capacity;
  selecting one PUCCH resource with the smallest PUCCH resource number.

For example, one combination is: selecting one PUCCH resource with the earliest starting symbol or selecting one PUCCH resource occupying the least number of symbols from the perspective of a transmission delay; selecting one PUCCH resource which meets the minimum of the carrying capacity if the starting symbols or the numbers of the occupied symbols of the plurality of PUCCH resources are the same from the perspective of overhead; if the capacity is also the same, selecting one PUCCH resource with the smallest PUCCH resource number; similarly, adjusting the above order according different selection rules is also possible.

If only one of the foregoing selection rules is selected, configuration by the network-side device (such as a base station) ensures that the selection rule may always select a unique PUCCH resource, that is, there is no plurality of PUCCH resources satisfying the selection rule, for example, one PUCCH resource with the earliest starting symbol is selected, and configuration by the base station ensures that the starting symbols of the plurality of PUCCH resources are different.

It should be noted that, in the foregoing third method and the fourth method, the PUCCH resource on the second carrier configured by the high-layer signaling is configured for each terminal which will perform PUCCH carrier switching, or is configured for the second carrier (then the same resource or resource set is configured for the plurality of terminals that switch to the transmission of the PUCCH on the second carrier, the corresponding network-side device needs to ensure that the number of the UEs that perform switching at the same time instant does not exceed the number of terminals that can be supported by the configured resource, and there is no PUCCH resource conflict among the terminals). That is, the PUCCH resource that may be used during the PUCCH carrier switching is preconfigured on the second carrier, and may be configured for each terminal that will perform the PUCCH carrier switching, that is to say, a resource is configured per UE on the second carrier; the PUCCH resources that are specific to the second carrier and used for PUCCH carrier switching are configured for the second carrier, that is, the PUCCH resources are not directed specifically to a specific UE, but may be used by any UE which switches to the second carrier, i.e., are shared by a plurality of UEs performing the PUCCH carrier switching.

The processing time requirement of UCI transmission may be a time duration required to prepare UCI transmission, including a time duration for processing downlink transmission, for example, when HARQ-ACK is transmitted on a PUCCH, a fixed time duration needs to be satisfied between the end position of downlink transmission (including the PDSCH, the PDCCH needing the HARQ-ACK feedback, such as the PDCCH indicating the SPS resource release and the PDCCH indicating the SCell dormancy) of the HARQ-ACK transmitted on the PUCCH and the start position of the PUCCH. This time duration is a time duration needed for PDSCH processing and preparation of HARQ-ACK transmission on the PUCCH. This time duration is processing time requirement of UCI transmission, for example defined as $T_{proc,1}=((N_1+d_{1,1}+d_{1,2})(2048+144)\cdot\kappa 2^{-\mu})\cdot T_c$, where $N_1$ is processing time related to capability of processing a PDSCH that needs the HARQ-ACK feedback and is a value selected from a processing capability list based on a reference $\mu$, $\kappa$ is a ratio between the LTE sampling interval and the NR sampling interval, $\mu$ is an index of the SCS, the reference $\mu$ is the minimum value of $\mu$ values corresponding to the PDCCH scheduling the PDSCH, the PDSCH itself, the PUCCH itself, etc. $T_C$ is the NR sampling interval, $d_{1,1}$ is the processing time offset value for transmitting the HARQ-ACKs on different uplink channels, and $d_{1,1}=0$ if the HARQ-ACK is transmitted on the PUCCH, $d_{1,1}=1$ if the HARQ-ACK is transmitted on the PUSCH, $d_{1,2}$ is the processing time offset related to the number of symbols occupied by the PDSCH.

Rule 2: sending a plurality of PUCCHs in a first time unit on the second carrier in a time division multiplexing (TDM) manner, wherein each PUCCH corresponds to one of the plurality of PUCCHs.

As an optional implementation, when adopting the rule 2, the method in the embodiments of the present disclosure may further include:

determining a symbol, in a first time unit on the second carrier, overlapping a symbol corresponding to each of the plurality of PUCCHs on a first carrier as a third PUCCH resource of each of the plurality of PUCCHs on the second carrier.

It should be noted that one PUCCH may occupy A symbols on the first carrier, but occupy B symbols on the second carrier, and B is less than A.

Based on this, in the embodiments of the present disclosure, determining a symbol, in the first time unit on the second carrier, overlapping a symbol corresponding to each of the plurality of PUCCHs on the first carrier as a third PUCCH resource of each PUCCH in the plurality of PUCCHs on the second carrier further includes at least one of following manners.

When the same symbol on the second carrier overlaps with symbols corresponding to at least two PUCCHs in the plurality of PUCCHs on the first carrier, determining that the symbol on the second carrier only belongs to a third PUCCH resource corresponding to one of the at least two PUCCHs on the second carrier, here, for example, one PUCCH having an earlier starting position in the at least two PUCCHs, one PUCCH having a later starting position in the at least two PUCCHs, or one PUCCH occupying a larger number of symbols in the at least two PUCCHs, or one PUCCH occupying a smaller number of symbols in the at least two PUCCHs, or one PUCCH carrying a larger number of UCI bits in the at least two PUCCHs, or one PUCCH carrying a smaller number of UCI bits in the at least two PUCCHs, etc.

For one PUCCH of the plurality of PUCCHs, if the number of symbols of a third PUCCH resource corresponding to the one PUCCH on the second carrier is less than the number of symbols of the PUCCH resource corresponding to the one PUCCH on the first carrier, then according to a carrying capacity or a target code rate of the third PUCCH resource, a part, not exceeding the carrying capacity or the target code rate, of the UCI carried in the one PUCCH is transmitted in the first time unit on the second carrier.

For one PUCCH of the plurality of PUCCHs, if the number of symbols of a PUCCH resource corresponding to the one PUCCH on the first carrier is less than or equal to a first threshold, and the number of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, in a first time unit on the second carrier, carried on the one PUCCH by using the third PUCCH resource, wherein the third-type PUCCH formats are PUCCH formats having a symbol number greater than or equal to the second threshold.

For one PUCCH of the plurality of PUCCHs, if the number of symbols of a PUCCH resource corresponding to the one PUCCH on the first carrier is greater than or equal to the second threshold, and the number of symbols of a third PUCCH resource corresponding to the one PUCCH on the second carrier is less than or equal to the first threshold, then determining to use one PUCCH format of pre-defined or pre-configured fourth-type PUCCH formats, and transmitting UCI carried on the one PUCCH in the first time unit on the second carrier by using the third PUCCH resource, wherein the fourth-type PUCCH formats are PUCCH formats having a symbol number less than or equal to the first threshold, and the first threshold is less than the second threshold. Optionally, the first threshold is 2, the second threshold is 4. A PUCCH format having the symbol number less than or equal to the first threshold is a short PUCCH format, for example, the PUCCH format 0 or the PUCCH format 2. A PUCCH format having the symbol number greater than or equal to the second threshold is a long PUCCH format, for example, the PUCCH format 1 or the PUCCH format 3 or he PUCCH format 4.

If it is determined that a PUCCH format including simultaneously both UCI of more than 2 bits and UCI of no more than 2 bit is included in a certain type of PUCCH format (a third type of PUCCH format or a fourth type of PUCCH format), a PUCCH format is determined according to the number of bits of the UCI carried by the PUCCH that needs to do the carrier switching. For example, it is determined that one format in the third type of PUCCH format is used on the second carrier, and the pre-defined or configured third type of PUCCH format includes PUCCH formats 1 and 3, and then a PUCCH format may be selected according to whether the number of UCI bits carried by the PUCCH to be switched exceeds 2 bits; the PUCCH format 3 may be selected if the number of UCI bits exceeds more than 2 bits; the PUCCH format 1 may be selected if the number of UCI bits does not exceed 2 bits.

It should be noted that, in the rule 1 or 2, PUCCH transmission is performed on the second carrier, and on basis of not requiring additional signaling notification or indication, the PUCCH resource for transmitting the PUCCH on the second carrier after the switching is determined, thereby ensuring normal implementation of transmission of PUCCH carrier switching, without adding additional signaling overhead.

Rule 3: selecting part of the plurality of PUCCHs, discarding part of the plurality of PUCCHs, and sending a PUCCH corresponding to the selected part of the plurality of PUCCHs in a first time unit on the second carrier by reusing the rule 1 or the rule 2; and specifically, determining a PUCCH resource, corresponding to the selected part of the plurality of PUCCHs, in the first time unit on the second carrier according to the above rule 1 and the rule 2, and performing transmission, the specific content is not repeated.

Rule 4: determining as an error schedule or configuration.

Here, specification of a protocol or scheduling of a base station guarantees (the terminal side does not expect that switching of a plurality of PUCCHs exists in a plurality of time units on a first carrier) that PUCCH switching only occurs in one of a plurality of time units on the first carrier, thereby avoiding that a plurality of PUCCHs transmitted in different time units on the first carrier need to be switched to the same time unit on the second carrier for transmission.

According to the carrier switching transmission method of the embodiments of the present disclosure, a plurality of physical uplink control channels (PUCCHs) transmitted on a first carrier need the carrier switching, and it is determined that the plurality of PUCCHs are transmitted in a first time unit on a second carrier after carrier switching, and the terminal sends the PUCCHs after the switching in a first time unit on the second carrier according to the first rule, wherein the plurality of PUCCHs on the first carrier do not overlap in the time domain, so that PUCCH transmission can be realized in a PUCCH carrier switching manner.

As shown in FIG. 2, which is a schematic flowchart of a carrier switching transmission method provided by embodiments of the present disclosure, the method includes:

Step 201: when a plurality of physical uplink control channels (PUCCHs) transmitted on a first carrier needs to do carrier switching, and each of the plurality of PUCCHs is determined to be transmitted in a first time unit on a second carrier after the carrier switching, receiving the plurality of PUCCHs after the carrier switching in the first time unit on the second carrier by the network-side device according to a first rule, wherein the plurality of PUCCHs does not overlap in a time domain on the first carrier.

That is, when it is determined that the plurality of PUCCHs transmitted on the first carrier need to be switched to the same time unit (i.e. the first time unit) on the second carrier for transmission, the network-side device (such as the base station) receives the PUCCHs in the first time unit on the second carrier according to the first rule after the switching.

For example, there are three PUCCHs on the first carrier which need carrier switching, but it is determined that there are two PUCCHs, of the three PUCCHs, to be transmitted in the first time unit on the second carrier after the carrier switching, and the network-side device receives the PUCCHs after the switching, in the first time unit on the second carrier according to the first rule. Here, the PUCCHs after the switching are related to the two PUCCHs of the three PUCCHs.

According to the carrier switching transmission method of the embodiments of the present disclosure, a plurality of physical uplink control channels (PUCCHs) transmitted on a first carrier need the carrier switching, and it is determined that the plurality of PUCCHs are transmitted in a first time unit on a second carrier after carrier switching, and the network-side device receives the PUCCHs after the switching in a first time unit on the second carrier according to the first rule, wherein the plurality of PUCCHs on the first carrier do not overlap in the time domain, so that PUCCH transmission can be realized in a PUCCH carrier switching manner.

In an optional implementation, in step 201, receiving the PUCCHs in the first time unit on the second carrier according to the first rule by the network-side device after the switching includes one of the following manners 1-4.

Rule 1: determining a first PUCCH resource in the first time unit on the second carrier, and receiving the PUCCH by using the first PUCCH resource in the first time unit on the second carrier, wherein the first PUCCH resource is used to carry Uplink Control Information (UCI) carried by all of the plurality of PUCCHs.

Further, when this rule 1 is used, determining the first PUCCH resource in the first time unit on the second carrier includes one of the following methods.

First method: performing UCI multiplexing on the first carrier according to a case with assumption that there is overlapping among the plurality of PUCCHs in the time domain and obtaining a second PUCCH resource for multiplexing transmission of the UCI on the first carrier, and determining a first PUCCH resource in a first time unit on the second carrier according to the start symbol and the number of symbols of the second PUCCH; it should be noted that UCI multiplexing is performed according to the case with the assumption that there is overlapping of the plurality of PUCCHs, and during transmission, cascaded transmission may exist or some information may be discarded.

Optionally, when adopting the first method, the frequency domain resource of the first PUCCH resource is the same as the frequency domain resource of the second PUCCH resource, and/or the code domain resource of the first PUCCH resource is the same as the code domain resource of the second PUCCH resource.

Here, the code domain resource may include a cyclic shift, an orthogonal sequence, or the like. The purpose of using the above configuration is to ensure that the RB will not exceed the bandwidth range of the second carrier according to the foregoing method.

Optionally, when the first method is used, the time unit of transmitting the PUCCH on the first carrier and the time unit of transmitting the PUCCH on the second carrier have the same unit, or the time unit of transmitting the PUCCH on the first carrier is less than or equal to the time unit of transmitting the PUCCH on the second carrier.

Here, the unit of the time unit of transmitting the PUCCH on the first carrier and the unit of the time unit of transmitting the PUCCH on the second carrier are the same, for example, are slots, or are sub-slots of the same length.

The time unit of transmitting the PUCCH on the first carrier is less than or equal to the time unit of transmitting the PUCCH on the second carrier. For example, the time unit of transmitting the PUCCH on the first carrier is a sub-slot with a length of 7 symbols, and the time unit of transmitting the PUCCH on the second carrier may be a slot or be a sub-slot with a length of 7 symbols.

A time unit of transmission may be one of a slot and a sub-slot, and the sub-slot may have different lengths, such as a 2-symbol sub-slot or a 7-symbol sub-slot. Here, if the type of the time unit of PUCCH transmission is not configured on the second carrier, it is determined that transmission is performed according to a time unit identical to the time unit of PUCCH transmission on the first carrier or according to a pre-agreed time unit of PUCCH transmission.

Second method: if there is the PUCCH corresponding to the physical downlink control channel (PDCCH) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in PDCCHs corresponding to the last PUCCH of the plurality of PUCCHs.

It should be noted that there is a PUCCH corresponding to a PDCCH in the plurality of PUCCHs, the PUCCH carries the HARQ-ACK, and the HARQ-ACK is the HARQ-ACK of the PDSCH scheduled by the PDCCH, or is the HARQ-ACK of the PDCCH indicating the SPS PDSCH resource release, or is the HARQ-ACK of the PDCCH indicating the SCell Dormancy, all of these PDCCHs are the PDCCHs corresponding to the PUCCH.

Determining, according to a PUCCH resource indication field in the first PDCCH, one PUCCH resource from a PUCCH resource set preconfigured on the second carrier as the first PUCCH resource includes:
  if there are a plurality of PUCCH resource sets, selecting one PUCCH resource set from the plurality of PUCCH resource sets according to the number of corresponding UCI bits after UCI multiplexing of the plurality of PUCCHs;
  determining a PUCCH resource as the first PUCCH resource in the selected PUCCH resource set according to the PUCCH resource indication field in the first PDCCH.

Third method: determining a first-type PUCCH resource preconfigured on the second carrier as the first PUCCH resource, wherein there is one first-type PUCCH resource pre-configured on the second carrier, and the first-type PUCCH resource is a PUCCH resource corresponding to a first type of preset PUCCH format, or a PUCCH resource having a carrying capacity greater than a preset threshold.

Here, a first-type PUCCH resource is pre-configured on the second carrier by means of a high-layer signaling.

Fourth method: performing UCI multiplexing according to assumption that there is time-domain overlapping among the plurality of PUCCHs, to obtain the bit number of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

Here, one or more PUCCH resource sets are pre-configured on the second carrier by means of high-layer signaling.

It should be noted that, in the above third method and the fourth method, optionally, the first type of preset PUCCH format is one of PUCCH formats 2, 3 and 4. Optionally, the preset threshold is 2 bits. Here, the first-type PUCCH resource has a sufficiently large capacity, and may balance both large bits and small bits.

In the fourth method, optionally, the second type of preset PUCCH format is one of PUCCH formats 0 and 1.

It should be noted that the second-type PUCCH resources may always be configured according to resources needed for transmission of 2-bit UCI (for example, when configuring the PUCCH format 0, it is always assumed that HARQ-ACK transmission using this PUCCH format always occupy 4 cyclic shifts), or may always be configured according to resources needed for transmission of 1-bit UCI, then if the UCI is 2 bits, then it is necessary to combine the 2-bit UCI to obtain 1-bit UCI for transmission.

In an optional implementation, where it is determined that the first PUCCH resource is the first-type PUCCH resource, the method further includes:
  obtaining the minimum number of resource blocks (RBs) actually occupied by the first PUCCH resource, according to the number of UCI bits that need to be transmitted on the first PUCCH resource and a preset transmission parameter of the first PUCCH resource;
  receiving the PUCCH through the first PUCCH resource based on the minimum number of RBs in the first time unit on the second carrier, wherein the first PUCCH resource carries UCIs carried by the plurality of PUCCHs.

Optionally, the preset transmission parameter is a parameter that can affect a carrying capacity of a resource, and includes, but is not limited to, a code rate, a time domain symbol number, a DMRS position, an orthogonal sequence, and a modulation level.

The resource overhead can be reduced by using this implementation.

As an optional implementation, the method in the embodiments of the present disclosure may further include:
  when the third method is used, if the number of bits of the UCI that needs to be transmitted on the first PUCCH resource is insufficient to use the predetermined threshold for using encoding transmission, supplementing information in the UCI until the predetermined threshold for using the encoding transmission is reached.

Optionally, the predetermined threshold is 3. When the first PUCCH resource is the first-type PUCCH resource, the UCI is transmitted in an encoding manner. The encoding manner is directed to a UCI bit number that is not less than the predetermined threshold, and therefore, for the UCI bit number that is less than the predetermined threshold, the predetermined threshold may be reached by supplementing bits. Specifically, the manner of supplementing the bits may be adding the bits at the tail or the header of the UCI, where the added bits may be placeholder bits, or repeating original information bits of the UCI, etc.

In an optional implementation, when the fourth method is adopted, determining one first PUCCH resource includes:

when the PUCCH resource set includes only one first-type PUCCH resource and one second-type PUCCH resource, determining a PUCCH resource in the one first-type PUCCH resource and the one second-type PUCCH resource as the first PUCCH resource according to the UCI bit number.

Optionally, when the PUCCH resource set includes a plurality of first-type PUCCH resources and/or a plurality of second-type PUCCH resources, a type of PUCCH resources is determined in the first-type PUCCH resources and the second-type PUCCH resources according to the number of bits of the UCI; when the determined type of PUCCH resources includes a plurality of PUCCH resources, a PUCCH resource satisfying a first preset condition is selected from the determined type of PUCCH resources as the first PUCCH resource.

The first preset condition is one of the following:
a starting position does not exceed a starting position of PUCCH resources corresponding to the plurality of PUCCHs on the first carrier;
a starting position does not exceed a starting position of a second PUCCH resource which is obtained by multiplexing the UCIs on the first carrier according to the assumption that there is time-domain overlapping among the plurality of PUCCHs and which is used for transmitting the multiplexed UCIs on the first carrier;
processing time requirement of the UCI transmission is satisfied.

The determining the first PUCCH resource is starting from a perspective of flexibility and consideration of a processing delay, a plurality of large-capacity PUCCH resources (i.e. first-type PUCCH resources) may be configured, and a plurality of small-capacity PUCCH resources (i.e. second-type PUCCH resources) may also be configured.

Further, if the number of PUCCH resources satisfying the first preset condition is multiple, a PUCCH resource is determined as the first PUCCH resource according to a preset selection rule.

The preset selection rule is at least one of following:
selecting one PUCCH resource with the earliest starting symbol;
selecting one PUCCH resource occupying the least number of symbols;
selecting one PUCCH resource which meets the minimum of the carrying capacity;
selecting one PUCCH resource with the smallest PUCCH resource number.

For example, one combination is: selecting one PUCCH resource with the earliest starting symbol or selecting one PUCCH resource occupying the least number of symbols from the perspective of a transmission delay; selecting one PUCCH resource which meets the minimum of the carrying capacity if the starting symbols or the numbers of the occupied symbols of the plurality of PUCCH resources are the same from the perspective of overhead; if the capacity is also the same, selecting one PUCCH resource with the smallest PUCCH resource number; similarly, adjusting the above order according different selection rules is also possible.

If only one of the foregoing selection rules is selected, configuration by the network-side device (such as a base station) ensures that the selection rule may always select a unique PUCCH resource, that is, there is no plurality of PUCCH resources satisfying the selection rule, for example, one PUCCH resource with the earliest starting symbol is selected, and configuration by the base station ensures that the starting symbols of the plurality of PUCCH resources are different.

It should be noted that, in the foregoing third method and the fourth method, the PUCCH resource on the second carrier configured by the high-layer signaling is configured for each terminal which will perform PUCCH carrier switching, or is configured for the second carrier (then the same resource or resource set is configured for the plurality of terminals that switch to the transmission of the PUCCH on the second carrier, the corresponding network-side device needs to ensure that the number of the UEs that perform switching at the same time instant does not exceed the number of terminals that can be supported by the configured resource, and there is no PUCCH resource conflict among the terminals).

Rule 2: receiving a plurality of PUCCHs in a first time unit on the second carrier in a time division multiplexing (TDM) manner, wherein each PUCCH corresponds to one of the plurality of PUCCHs.

As an optional implementation, when adopting the rule 2, the method in the embodiments of the present disclosure may further include:

determining a symbol, in a first time unit on the second carrier, overlapping a symbol corresponding to each of the plurality of PUCCHs on a first carrier as a third PUCCH resource of each of the plurality of PUCCHs on the second carrier.

It should be noted that one PUCCH may occupy A symbols on the first carrier, but occupy B symbols on the second carrier, and B is less than A.

Based on this, in the embodiments of the present disclosure, determining a symbol, in the first time unit on the second carrier, overlapping a symbol corresponding to each of the plurality of PUCCHs on the first carrier as a third PUCCH resource of each PUCCH in the plurality of PUCCHs on the second carrier further includes at least one of following manners.

When the same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier, here, for example, one PUCCH having an earlier starting position in the at least two PUCCHs, one PUCCH having a later starting position in the at least two PUCCHs, or one PUCCH occupying a larger number of symbols in the at least two PUCCHs, or one PUCCH occupying a smaller number of symbols in the at least two PUCCHs, or one PUCCH carrying a larger number of UCI bits in the at least two PUCCHs, or one PUCCH carrying a smaller number of UCI bits in the at least two PUCCHs, etc.

For one PUCCH of the plurality of PUCCHs, if the number of symbols of a third PUCCH resource corresponding to the one PUCCH on the second carrier is less than the number of symbols of the PUCCH resource corresponding to the one PUCCH on the first carrier, then according to a carrying capacity or a target code rate of the third PUCCH resource, receiving a part, not exceeding the carrying capacity or the target code rate, of the UCI carried in the one PUCCH in the first time unit on the second carrier.

For one PUCCH of the plurality of PUCCHs, if the number of symbols of a PUCCH resource corresponding to the one PUCCH on the first carrier is less than or equal to a first threshold, and the number of symbols of a third PUCCH resource corresponding to the one PUCCH on the second carrier is greater than or equal to a second threshold, then determining to use one PUCCH format of a pre-defined or pre-configured third-type PUCCH formats, and receiving UCI, in a first time unit on the second carrier, carried on the one PUCCH by using the third PUCCH resource, wherein the third-type PUCCH formats are PUCCH formats having a symbol number greater than or equal to the second threshold.

For one PUCCH of the plurality of PUCCHs, if the number of symbols of a PUCCH resource corresponding to the one PUCCH on the first carrier is greater than or equal to the second threshold, and the number of symbols of a third PUCCH resource corresponding to the one PUCCH on the second carrier is less than or equal to the first threshold, then determining to use one PUCCH format of pre-defined or pre-configured fourth-type PUCCH formats, and receiving UCI carried on the one PUCCH in the first time unit on the second carrier by using the third PUCCH resource, wherein the fourth-type PUCCH formats are PUCCH formats having a symbol number less than or equal to the first threshold, and the first threshold is less than the second threshold. Optionally, the first threshold is 2, the second threshold is 4. A PUCCH format having the symbol number less than or equal to the first threshold is a short PUCCH format, for example, the PUCCH format 0 or the PUCCH format 2. A PUCCH format having the symbol number greater than or equal to the second threshold is a long PUCCH format, for example, the PUCCH format 1 or the PUCCH format 3 or he PUCCH format 4.

If it is determined that a PUCCH format including simultaneously both UCI of more than 2 bits and UCI of no more than 2 bit is included in a certain type of PUCCH format (a third type of PUCCH format or a fourth type of PUCCH format), a PUCCH format is determined according to the number of bits of the UCI carried by the PUCCH that needs to do the carrier switching. For example, it is determined that one format in the third type of PUCCH format is used on the second carrier, and the pre-defined or configured third type of PUCCH formats includes PUCCH formats 1 and 3, and then a PUCCH format may be selected according to whether the number of UCI bits carried by the PUCCH to be switched exceeds 2 bits; the PUCCH format 3 may be selected if the number of UCI bits exceeds more than 2 bits; the PUCCH format 1 may be selected if the number of UCI bits does not exceed 2 bits.

It should be noted that, in the rule 1 or 2, PUCCH transmission is performed on the second carrier, and on basis of not requiring additional signaling notification or indication, the PUCCH resource for transmitting the PUCCH on the second carrier after the switching is determined, thereby ensuring normal implementation of transmission of PUCCH carrier switching, without adding additional signaling overhead.

Rule 3: selecting part of the plurality of PUCCHs, discarding part of the plurality of PUCCHs, and receiving PUCCHs corresponding to the selected part of the plurality of PUCCHs in a first time unit on the second carrier by reusing the rule 1 or the rule 2.

Rule 4: determining as an error schedule or configuration.

Here, specification of a protocol or scheduling of a base station guarantees (the terminal side does not expect that switching of a plurality of PUCCHs exists in a plurality of time units on a first carrier) PUCCH switching only occurs in one of a plurality of time units on the first carrier, thereby avoiding that a plurality of PUCCHs transmitted in different time units on the first carrier need to be switched to the same time unit on the second carrier for transmission.

According to the carrier switching transmission method of the embodiments of the present disclosure, a plurality of physical uplink control channels (PUCCHs) transmitted on a first carrier need the carrier switching, and it is determined that the plurality of PUCCHs are transmitted in a first time unit on a second carrier after carrier switching, and the network-side device receives the PUCCHs after the switching in a first time unit on the second carrier according to the first rule, wherein the plurality of PUCCHs on the first carrier do not overlap in the time domain, so that PUCCH transmission can be realized in a PUCCH carrier switching manner.

The following two embodiments specifically illustrate an implementation process of the carrier switching transmission method of the present disclosure.

Embodiment 1: a subcarrier spacing (SCS) of the first carrier and the SCS of the second carrier are different.

Assuming that the SCS of the first carrier is larger, for example, the SCS of the first carrier is 30 KHz, and the SCS of the second carrier is 15 KHz, two slots on the first carrier are equivalent to a time length of one slot on the second carrier.

It is assumed that the units of the time units on the two carriers are slots, and when it is determined that PUCCH needs to be transmitted in a slot 2n (i.e., a slot m+k) on the first carrier and it is determined, according to a PUCCH carrier switching rule, that PUCCH carrier switching needs to occur in a slot 2n on the first carrier, and that a PUCCH 1 in the slot 2n is transmitted in a slot n on the second carrier after the switching. Further, if a PUCCH 2 also exists in the slot 2n+1 on the first carrier and the PUCCH 2 also needs the switching and is also transmitted in the slot n on the second carrier after the switching, then according to the rule 1, it is determined that the UCI on the PUCCH 1 and the UCI on the PUCCH 2 are multiplexed and transmitted on the same PUCCH resource on the second carrier; and one PUCCH resource is determined in the slot n on the second carrier according to one of the following methods:

Method 1: performing multiplexing of UCIs on the PUCCH 1 and the PUCCH 2 according to the assumption that there is the time-domain overlapping, determining a PUCCH resource for multiplexing transmission on one first carrier, and taking the starting symbol and the number of occupied symbols of the PUCCH resource as a reference, determining a PUCCH resource in the slot n on the second carrier for simultaneously transmitting the UCI on the PUCCH 1 and the UCI on the PUCCH 2; as shown in FIG. 3.

Method 2: determining one PUCCH resource in a PUCCH resource set preconfigured on the second carrier, according to the PUCCH resource indication field in the last PDCCH corresponding to the PUCCH 1 and the PUCCH 2, and the multiplexed UCI bit number obtained by multiplexing the PUCCH 1 and the PUCCH 2; wherein the time domain position and the frequency domain RB and the possible code domain information (the cyclic shift and the orthogonal sequence) of the determined PUCCH resource may be independent of PUCCH resources on the first carrier, and may be different from those of PUCCH resources of the first carrier, as shown in FIG. 4.

Figure 5:
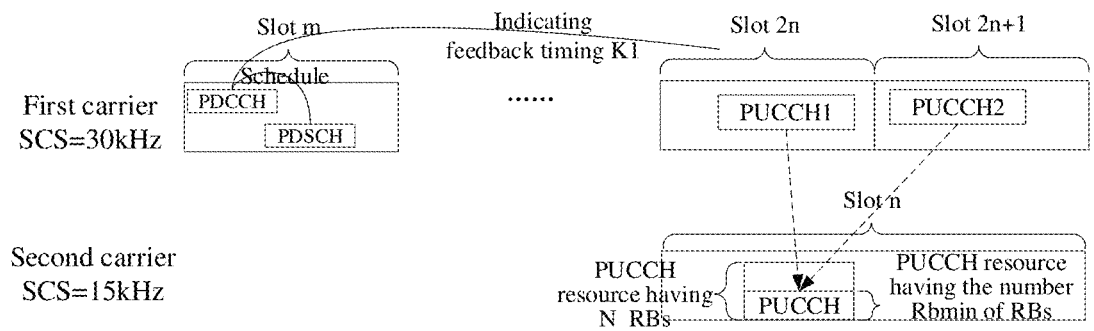
FIG. 5 is a third schematic diagram of an example of determining a PUCCH resource on a second carrier in a carrier switching transmission method according to the embodiments of the present disclosure.

Method 3: as shown in FIG. 5, assuming that only one large-capacity PUCCH resource is configured on the second carrier for transmission of PUCCH carrier switching, all PUCCHs needing the PUCCH carrier switching are transmitted on a second carrier by using this large-capacity PUCCH resource, and the minimum RB number (RBmin) actually required for transmitting these UCI bits may be calculated according to the number of UCI bits obtained after multiplexing and some transmission parameters of the PUCCH resource on the second carrier, for example, parameters such a code rate, the time-domain symbol number, the DMRS position, the orthogonal sequence, a modulation level which affect the M PUCCH carrying capacity. For example, the minimum RB number is a numerical value $M_{RB,min}^{PUCCH}$ satisfying the following formula:

$$(O_{ACK} + O_{CRC}) \le M_{RB,min}^{PUCCH} \cdot N_{sc,ctrl}^{RB} \cdot N_{symb-UCI}^{PUCCH} \cdot Q_m \cdot r$$

where r is the code rate, $Q_m$ is the modulation level, $N_{symb-UCI}^{PUCCH}$ is the number of symbols for transmitting UCI in symbols occupied by the PUCCH (i.e. symbols other than symbols occupied by the DMRS), $N_{sc,ctrl}^{RB}$ is the number of subcarriers included in one RB, $O_{CRC}$ is the number of CRC bits added for encoding, and $O_{ACK}$ is the number of HARQ-ACK bits carried by the PUCCH (if the UCI is another UCI, then $O_{ACK}$ is the number of bits of another UCI). Here, the large-capacity PUCCH resource may correspond to the first-type PUCCH resource in the foregoing embodiment.

Method 4: assuming that two PUCCH resources are configured on the second carrier, one PUCCH resource is a large-capacity PUCCH resource, for example, a PUCCH format 3, and occupies N RBs; one PUCCH resource is a small-capacity PUCCH resource, for example, a PUCCH format 0; then one of the two PUCCH resources configured on the second carrier is selected according to the number of UCI bits obtained after multiplexing, and if it is determined that the number of UCI bits does not exceed 2 bits, then selecting the small-capacity PUCCH resource; and if it is determined that the number of UCI bits exceeds 2 bits, then selecting the large-capacity PUCCH resource, and determining the actually occupied Rbmin according to the same manner as that in the method 3. An example diagram is similar to FIG. 5, except that this resource is selected from multiple resources.

Here, the small-capacity PUCCH resource may correspond to the second-type PUCCH resource in the foregoing embodiment.

According to the rule 2, it is determined that the UCI on the PUCCH 1 and the UCI on the PUCCH 2 are respectively transmitted on different PUCCH resources being TDM on the second carrier.

Figure 6:
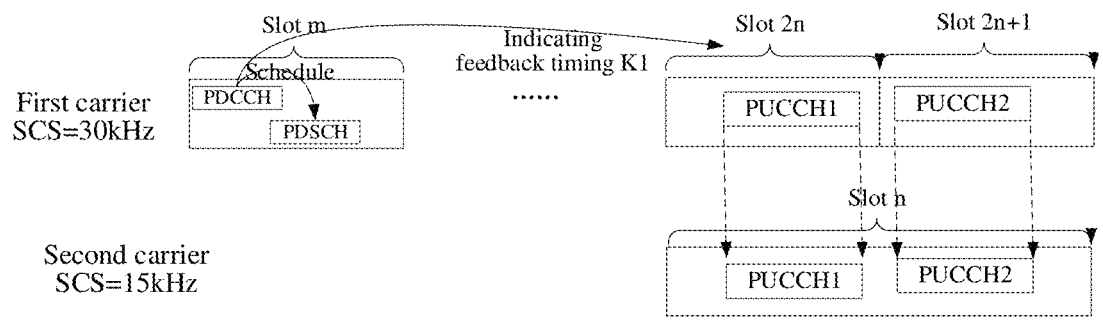
FIG. 6 is a fourth schematic diagram of an example of determining a PUCCH resource on a second carrier in a carrier switching transmission method according to the embodiments of the present disclosure.

As shown in FIG. 6, the corresponding PUCCH resource in the time unit of transmitting the PUCCH may be determined on the second carrier according to the start symbols of the PUCCH 1 and the PUCCH 2 on the first carrier and the number of symbols occupied by the PUCCH 1 and the PUCCH 2 on the first carrier.

If the resources of the plurality of PUCCHs overlap with the same symbol on the second carrier, determining which PUCCH resource on the second carrier this symbol on the second carrier belongs to, according to a predetermined rule; and if the PUCCH format is changed, then changing according to the manner agreed in the method 2.

In the foregoing process, the terminal and the network-side device (such as the base station) use the same method to determine the PUCCH resource on the second carrier, and which PUCCHs the UCI carried on the PUCCH resource is from, the terminal side sends the PUCCH on the determined PUCCH resource, and the network-side device (such as the base station) side receives the PUCCH on the determined PUCCH resource.

Embodiment 2: the SCS of the first carrier and the SCS of the second carrier are the same.

Assuming that a sub-slot with a length of 7 symbols on a first carrier is used as a PUCCH transmission time unit, a unit of K1 indicating the feedback timing on the first carrier is also a sub-slot, and a slot on the second carrier is used as a PUCCH transmission time unit, then it may be determined that transmission of PUCCH 1 needs to be performed in a sub-slot 2n of the first carrier and the PUCCH 1 carries the HARQ-ACK of the PDSCH, and according to a PUCCH carrier switching rule, it is determined that the carrier switching of the PUCCH 1 in the sub-slot 2n on the first carrier needs to be performed, and the PUCCH 1 is transmitted in the slot n on the second carrier after the switching, for example, there is also PUCCH 2 transmission in the sub-slot 2n+1 on the first carrier (this PUCCH may also carry the HARQ-ACK, or other UCI is carried), and if it is also determined that the switching of the PUCCH 2 is required according to the PUCCH carrier switching rule, and the transmission of the PUCCH 2 is also determined to be in the slot n on the second carrier, then two PUCCHs need to be transmitted in the slot n on the second carrier.

Figure 7:
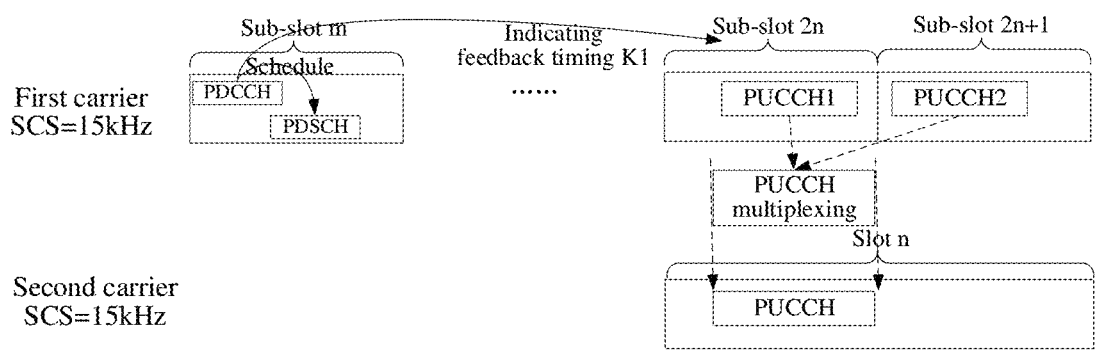
FIG. 7 is a fifth schematic diagram of an example of determining a PUCCH resource on a second carrier in a carrier switching transmission method according to the embodiments of the present disclosure.

The specific processing manner in this embodiment is similar to that of the embodiment 1, and the difference is that the slot on the first carrier is replaced with the sub-slot, the SCS of the first carrier is changed, for example, as shown in FIG. 7 (corresponding to FIG. 3), difference among the figures is not repeated.

In the foregoing embodiment, changing the combination of the SCSs of the first carrier and the second carrier is also applicable in the present application, and details are not described again.

It should be noted that taking the slot or the sub-slot as a time unit above is merely an example, a further case that a time unit in any one of the carriers is changed as one of slots or sub-slots, or sub-slots having different numbers of symbols are configured on the two carriers respectively, for example, one sub-slot is a sub-slot of two symbols, one sub-slot is a sub-slot of 7 symbols, has a specific execution mode similar to the above, and details are not described again. Only the PUCCH carrying the HARQ-ACK of the PDSCH scheduled by the PUCCH is taken as an example, the case that the PDSCH is scheduled by the PDCCH is replaced with the PDCCH requiring the HARQ-ACK, and the difference is that the HARQ-ACK may be the HARQ-ACK of the PDCCH itself, and when the PUCCH carries other UCI, difference may be the CSI and/or the SR, the first time unit in which the PUCCH is transmitted on the first carrier and the specific resource in the first time unit are determined according to the high-layer signaling, and are not based on notification of the PDCCH. In the foregoing embodiment, one PUCCH may be selected from the foregoing in rule 3 for the switching, and another PUCCH may be determined to be discarded.

Figure 8:
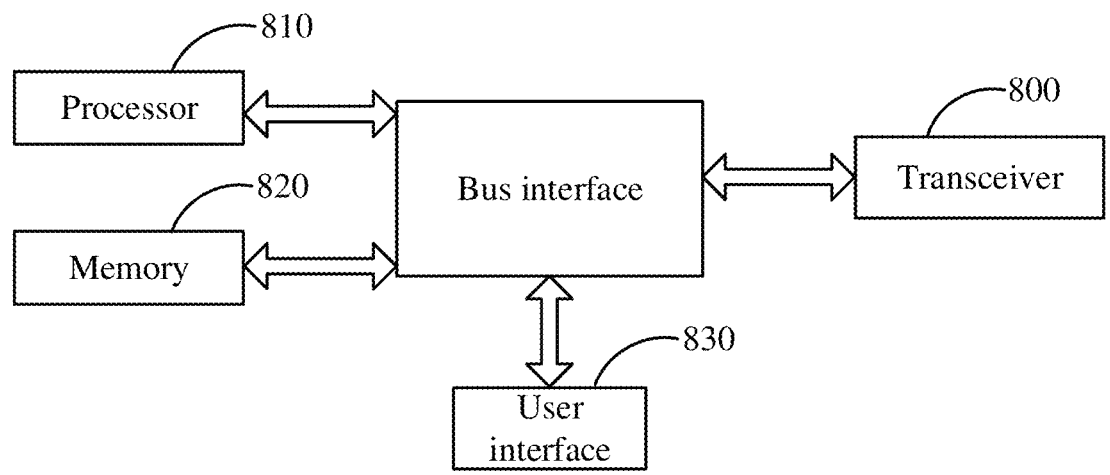
FIG. 8 is a structural block diagram of a terminal according to the embodiments of the present disclosure.

As shown in FIG. 8, an embodiment of the present disclosure further provides a terminal. The terminal includes: a memory 820, a transceiver 800, and a processor 810. The memory 820 is configured to store program instructions; the transceiver 800 is configured to send and receive data under the control of the processor 810; and the processor 810 is configured to read the program instructions in the memory 820 and perform the following operations:

when a plurality of physical uplink control channels (PUCCHs) transmitted on a first carrier needs to do carrier switching, and each of the plurality of PUCCHs is determined to be transmitted in a first time unit on a second carrier after the carrier switching, sending PUCCHs in the first time unit on the second carrier according to a first rule after the carrier switching occurs, wherein the plurality of PUCCHs does not overlap in a time domain on the first carrier.

In FIG. 8, a bus architecture may include any number of interconnected buses and bridges. Specifically, various circuits such as one or more processors represented by the processor 810 and a memory represented by the memory 820 are linked together. The bus architecture may also link together various other circuits, such as peripheral devices, voltage regulators, and power management circuits, etc. which are well known in the art, and therefore are not further described herein. The bus interface provides an interface. The transceiver 800 may be a plurality of elements, i.e. include a transmitter and a receiver, and provide units for communicating with various other devices on transmission media. The transmission media include transmission media such as a wireless channel, a wired channel, and an optical cable. For different user equipment, a user interface 830 may also be an interface that can be externally connected to a required device, and the connected device includes, but is not limited to, a keypad, a display, a speaker, a microphone, a joystick, etc.

The processor 810 is responsible for managing the bus architecture and general processing, and the memory 820 may store data used by the processor 810 when performing an operation.

Optionally, the processor 810 may be a Central Processing Unit (CPU), An Application-Specific Integrated Circuit (ASIC), a Field-Programmable Gate Array (FPGA), or a Complex Programmable Logic Device (CPLD), and the processor 810 may also adopt a multi-core architecture.

The processor 810 is configured to, by invoking the program instructions stored in the memory, perform any of the methods provided in the embodiments of the present disclosure according to the obtained executable instructions. The processor 810 and the memory 820 may also be physically separately arranged.

Optionally, the processor 810 is configured to read the program instructions in the memory and perform the following operations:

rule 1: determining a first PUCCH resource in the first time unit on the second carrier, multiplexing uplink control information (UCI) carried by the plurality of PUCCHs on the first PUCCH resource, and sending the multiplexed uplink control information UCI in the first time unit on the second carrier;

rule 2: sending the plurality of PUCCHs in the first time unit on the second carrier in a time division multiplexing (TDM) manner, wherein each PUCCH corresponds to one of the plurality of PUCCHs;

rule 3: selecting part of the plurality of PUCCHs, discarding part of the plurality of PUCCHs, and sending a PUCCH corresponding to the selected part of the plurality of PUCCHs in the first time unit on the second carrier by using the rule 1 or the rule 2;

rule 4: determining as an error schedule or configuration.

Optionally, when the rule 1 is used, the processor 810 is configured to read the program instruction in the memory and perform the following operations:

first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining a first PUCCH resource in the first time unit on the second carrier according to a start symbol and the number of symbols of the second PUCCH resource;

second method: if there is a PUCCH corresponding to a physical downlink control channel (PDCCH) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determining a first-type PUCCH resource preconfigured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: performing UCI multiplexing according to assumption that there is time-domain overlapping among the plurality of PUCCHs, and obtaining the bit number of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

Optionally, when adopting the first method, the frequency domain resource of the first PUCCH resource is the same as the frequency domain resource of the second PUCCH resource, and/or the code domain resource of the first PUCCH resource is the same as the code domain resource of the second PUCCH resource.

Optionally, when the first method is used, the time unit of transmitting the PUCCH on the first carrier and the time unit of transmitting the PUCCH on the second carrier have the same unit, or the time unit of transmitting the PUCCH on the first carrier is less than or equal to the time unit of transmitting the PUCCH on the second carrier.

Optionally, when it is determined that the first PUCCH resource is the first-type PUCCH resource, the processor 810 is configured to read the program instructions in the memory and perform the following operations:

obtaining the minimum number of resource blocks (RBs) actually occupied by the first PUCCH resource, according to the number of UCI bits that need to be transmitted on the first PUCCH resource and a preset transmission parameter of the first PUCCH resource;

multiplexing UCIs carried by the plurality of PUCCHs on the first PUCCH resource based on the minimum number of RBs, and sending the multiplexed UCIs in the first time unit on the second carrier.

Optionally, the processor 810 is configured to read the program instructions in the memory and perform the following operations:

when the third method is used, if the number of bits of the UCI that needs to be transmitted on the first PUCCH resource is insufficient to use the predetermined threshold for using encoding transmission, supplementing information in the UCI until the predetermined threshold for using the encoding transmission is reached.

Optionally, when using the fourth method, the processor 810 is configured to read the program instructions in the memory and perform the following operations:

when the PUCCH resource set includes only one first-type PUCCH resource and one second-type PUCCH resource, determining a PUCCH resource in the one first-type PUCCH resource and the one second-type PUCCH resource as the first PUCCH resource according to the UCI bit number;

when the PUCCH resource set includes a plurality of first-type PUCCH resources and/or a plurality of second-type PUCCH resources, determining a type of PUCCH resources in the plurality of first-type PUCCH resources and the plurality of second-type PUCCH resources according to the number of bits of the UCI; when the determined type of PUCCH resources includes a plurality of PUCCH resources, selecting a PUCCH resource, satisfying a first preset condition, from the determined type of PUCCH resources as the first PUCCH resource.

The first preset condition is one of the following:

a starting position does not exceed a starting position of any PUCCH resource corresponding to the plurality of PUCCHs on the first carrier;

a starting position does not exceed a starting position of a second PUCCH resource which is obtained by multiplexing the UCIs on the first carrier according to the assumption that there is time-domain overlapping among the plurality of PUCCHs, and which is used for transmitting the multiplexed UCIs on the first carrier;

processing time requirement of the UCI transmission is satisfied.

Optionally, if the number of PUCCH resources satisfying the first preset condition is multiple, a PUCCH resource is determined as the first PUCCH resource according to a preset selection rule.

The preset selection rule is at least one of following:

selecting one PUCCH resource with the earliest starting symbol;

selecting one PUCCH resource occupying the least number of symbols;

selecting one PUCCH resource which meets the minimum of the carrying capacity;

selecting one PUCCH resource with the smallest PUCCH resource number.

Optionally, when the rule 2 is used, the processor 810 is configured to read the program instructions in the memory and perform the following operations:

determining a symbol, in a first time unit on the second carrier, overlapping a symbol corresponding to each of the plurality of PUCCHs on a first carrier as a third PUCCH resource of each of the plurality of PUCCHs on the second carrier.

Optionally, the processor 810 is configured to read the program instructions in the memory and perform the following operations:

when the same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;

for one PUCCH of the plurality of PUCCHs, if the number of symbols of a third PUCCH resource corresponding to the one PUCCH on the second carrier is less than the number of symbols of the PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;

for one PUCCH of the plurality of PUCCHs, if the number of symbols of a PUCCH resource corresponding to the one PUCCH on the first carrier is less than or equal to a first threshold, and the number of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, in a first time unit on the second carrier, carried on the one PUCCH by using the third PUCCH resource, wherein the third-type PUCCH formats are PUCCH formats having a symbol number greater than or equal to the second threshold;

for one PUCCH of the plurality of PUCCHs, if the number of symbols of a PUCCH resource corresponding to the one PUCCH on the first carrier is greater than or equal to the second threshold, and the number of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI carried on the one PUCCH in the first time unit on the second carrier by using the third PUCCH resource, wherein the fourth-type PUCCH formats are PUCCH formats having a symbol number less than or equal to the first threshold, and the first threshold is less than the second threshold.

According to the terminal of the embodiments of the present disclosure, a plurality of physical uplink control channels (PUCCHs) transmitted on a first carrier need the carrier switching, and it is determined that the plurality of PUCCHs are transmitted in a first time unit on a second carrier after the carrier switching, and the terminal sends the PUCCHs after the switching in a first time unit on the second carrier according to the first rule, wherein the plurality of PUCCHs on the first carrier do not overlap in the time domain, so that PUCCH transmission can be realized through PUCCH carrier switching.

Figure 9:
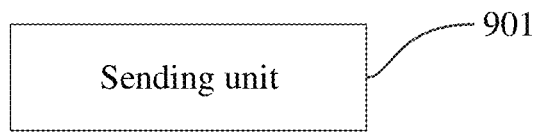
FIG. 9 is a second schematic block diagram of a carrier switching transmission apparatus according to the embodiments of the present disclosure.

As shown in FIG. 9, an embodiment of the present disclosure further provides a carrier switching transmission apparatus. The apparatus includes:

a sending unit 901, configured to, when a plurality of physical uplink control channels (PUCCHs) transmitted on a first carrier needs to do carrier switching, and each of the plurality of PUCCHs is determined to be transmitted in a first time unit on a second carrier after the carrier switching, send PUCCHs in the first time unit on the second carrier according to a first rule after the carrier switching occurs, wherein the plurality of PUCCHs does not overlap in a time domain on the first carrier.

Optionally, the sending unit 901 is specifically configured to:
  rule 1: determine one first PUCCH resource in the first time unit on the second carrier, multiplex uplink control information (UCIs) carried by the plurality of PUCCHs on the first PUCCH resource, and send the multiplexed uplink control information UCIs in the first time unit on the second carrier;
  rule 2: send the plurality of PUCCHs in the first time unit on the second carrier in a time division multiplexing (TDM) manner, wherein each PUCCH corresponds to one of the plurality of PUCCHs;
  rule 3: select part of the plurality of PUCCHs, discarding part of the plurality of PUCCHs, and send a PUCCH corresponding to the selected part of the plurality of PUCCHs in the first time unit on the second carrier by using the rule 1 or the rule 2;
  rule 4: determining as an error schedule or configuration.

Optionally, when the mode 1 is used, the sending unit 901 is specifically configured to:
  first method: perform UCI multiplexing on the first carrier according to a case with assumption that there is overlapping among the plurality of PUCCHs in the time domain, and obtain a second PUCCH resource for multiplexing transmission of the UCIs on the first carrier, and determine one first PUCCH resource in the first time unit on the second carrier according to a start symbol and the number of symbols of the second PUCCH resource;
  second method: if there is a PUCCH corresponding to a physical downlink control channel (PDCCH) in the plurality of PUCCHs, determine, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;
  third method: determine one first-type PUCCH resource preconfigured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;
  fourth method: perform UCI multiplexing according to assumption that there is time-domain overlapping among the plurality of PUCCHs, and obtain the bit number of the multiplexed UCI, and determine one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

Optionally, when adopting the method 1, the frequency domain resource of the first PUCCH resource is the same as the frequency domain resource of the second PUCCH resource, and/or the code domain resource of the first PUCCH resource is the same as the code domain resource of the second PUCCH resource.

Optionally, when the first method is used, the time unit of transmitting the PUCCH on the first carrier and the time unit of transmitting the PUCCH on the second carrier have the same unit, or the time unit of transmitting the PUCCH on the first carrier is less than or equal to the time unit of transmitting the PUCCH on the second carrier.

Optionally, when it is determined that the first PUCCH resource is the first-type PUCCH resource, the sending unit 901 is further specifically configured to:
  obtain the minimum number of resource blocks (RBs) actually occupied by the first PUCCH resource, according to the number of UCI bits that need to be transmitted on the first PUCCH resource and a preset transmission parameter of the first PUCCH resource;
  multiplex UCIs carried by the plurality of PUCCHs on the first PUCCH resource based on the minimum number of RBs, and send the multiplexed UCIs in the first time unit on the second carrier.

Optionally, the carrier switching transmission apparatus further includes a first processing unit configured to:
  when the third method is used, if the number of bits of the UCIs that need to be transmitted on the first PUCCH resource is insufficient to use the predetermined threshold for using encoding transmission, supplement information in the UCIs until the predetermined threshold for using the encoding transmission is reached.

Optionally, when using the fourth method, the sending unit 901 is further specifically configured to:
  when the PUCCH resource set includes only one first-type PUCCH resource and one second-type PUCCH resource, determine a PUCCH resource in the one first-type PUCCH resource and the one second-type PUCCH resource as the first PUCCH resource according to the UCI bit number; or,
  when the PUCCH resource set includes a plurality of first-type PUCCH resources and/or a plurality of second-type PUCCH resources, determine a type of PUCCH resources in the plurality of first-type PUCCH resources and the plurality of second-type PUCCH resources according to the number of bits of the UCIs; when the determined type of PUCCH resources includes a plurality of PUCCH resources, select a PUCCH resource, satisfying a first preset condition, from the determined type of PUCCH resources as the first PUCCH resource.

The first preset condition is one of the following:
  a starting position does not exceed starting positions of PUCCH resources corresponding to the plurality of PUCCHs on the first carrier;
  a starting position does not exceed a starting position of a second PUCCH resource which is obtained by multiplexing the UCIs on the first carrier according to the assumption that there is time-domain overlapping among the plurality of PUCCHs, and which is used for transmitting the multiplexed UCIs on the first carrier;

processing time requirement of the UCI transmission is satisfied.

Optionally, if the number of PUCCH resources satisfying the first preset condition is multiple, a PUCCH resource is determined as the first PUCCH resource according to a preset selection rule.

The preset selection rule is at least one of following:

selecting one PUCCH resource with the earliest starting symbol;

selecting one PUCCH resource occupying the least number of symbols;

selecting one PUCCH resource which meets the minimum of the carrying capacity;

selecting one PUCCH resource with the smallest PUCCH resource number.

Optionally, when the rule 2 is used, the carrier switching transmission apparatus further includes:

a second processing unit, configured to determine a symbol, in a first time unit on the second carrier, overlapping a symbol corresponding to each of the plurality of PUCCHs on a first carrier as a third PUCCH resource of the each of the plurality of PUCCHs on the second carrier.

Optionally, at least one of following is further implemented by the carrier switching transmission apparatus:

when the same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;

for one PUCCH of the plurality of PUCCHs, if the number of symbols of a third PUCCH resource corresponding to the one PUCCH on the second carrier is less than the number of symbols corresponding to the PUCCH resource of the one PUCCH on the first carrier, then according to a carrying capacity or a target code rate of the third PUCCH resource, send a part, not exceeding the carrying capacity or the target code rate, of the UCI carried in the one PUCCH in the first time unit on the second carrier;

for one PUCCH of the plurality of PUCCHs, if the number of symbols of a PUCCH resource corresponding to the one PUCCH on the first carrier is less than or equal to a first threshold, and the number of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, in a first time unit on the second carrier, carried on the one PUCCH by using the third PUCCH resource, wherein the third-type PUCCH formats are PUCCH formats having a symbol number greater than or equal to the second threshold;

for one PUCCH of the plurality of PUCCHs, if the number of symbols of a PUCCH resource corresponding to the one PUCCH on the first carrier is greater than or equal to the second threshold, and the number of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI carried on the one PUCCH in the first time unit on the second carrier by using the third PUCCH resource, wherein the fourth-type PUCCH formats are PUCCH formats having a symbol number less than or equal to the first threshold, and the first threshold is less than the second threshold.

According to the carrier switching transmission apparatus of the embodiments of the present disclosure, a plurality of physical uplink control channels (PUCCHs) transmitted on a first carrier need the carrier switching, and it is determined that the plurality of PUCCHs are transmitted in a first time unit on a second carrier after the carrier switching, and the terminal sends the PUCCHs after the switching in a first time unit on the second carrier according to the first rule, wherein the plurality of PUCCHs on the first carrier do not overlap in the time domain, so that PUCCH transmission can be realized through PUCCH carrier switching.

It should be noted that, division of the units in the embodiments of the present disclosure is schematic, but is merely a logical function division, and there may be another division manner in actual implementation. In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of the software functional unit and sold or used as an independent product, the integrated unit may be stored in a processor-readable storage medium. Based on such understanding, some or all or part of the technical solutions of the present disclosure may be embodied in the form of a software product, and the computer software product is stored in a storage medium, and includes several instructions for enabling a computer device (which may be a personal computer, a server, or a network device, etc.) or a processor to perform all or part of the steps of the methods according to various embodiments of the present disclosure. The foregoing storage medium includes various media that can store program codes, such as a USB flash disk, a mobile hard disk, a read-only memory (ROM), a random access memory (RAM), a magnetic disk, or an optical disk.

It should be noted that the above-mentioned apparatus provided in the embodiments of the present disclosure can implement all method steps implemented by the foregoing method embodiments, and can achieve the same technical effect, and the same parts between the method claims and the apparatus claims and beneficial effects of the method embodiments in this embodiment are not described in detail herein.

In some embodiments of the present disclosure, a processor-readable storage medium is further provided, the processor-readable storage medium stores program instructions, and the program instructions are configured to cause a processor to perform the following steps:

when a plurality of physical uplink control channels (PUCCHs) transmitted on a first carrier needs to do carrier switching, and each of the plurality of PUCCHs is determined to be transmitted in a first time unit on a second carrier after the carrier switching, sending PUCCHs in the first time unit on the second carrier according to a first rule after the carrier switching occurs.

When the program instructions are executed by the processor, all implementations of the foregoing method embodiments applied to the terminal side shown in FIG. 1 may be implemented, and in order to avoid repetition, details are not described herein again.

Figure 10:
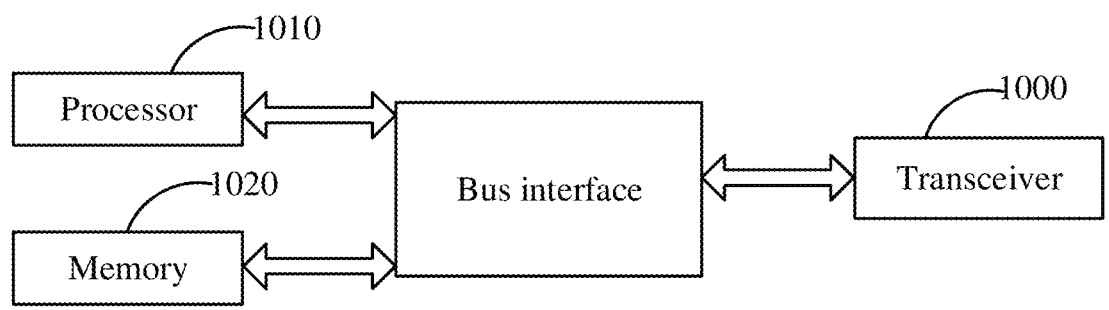
FIG. 10 is a structural block diagram of a network-side device according to the embodiments of the present disclosure.

As shown in FIG. 10, an embodiment of the present disclosure further provides a network-side device. The network-side device includes: a memory 1020, a transceiver 1000, a processor 1010. The memory 1020 is configured to store a computer program; the transceiver 1000 is configured to send and receive data under the control of the processor 1010; and the processor 1010 is configured to read the computer program in the memory 1020 and perform the following operations:

> when a plurality of physical uplink control channels (PUCCHs) transmitted on a first carrier needs to do carrier switching, and each of the plurality of PUCCHs is determined to be transmitted in a first time unit on a second carrier after the carrier switching, receiving the plurality of PUCCHs in the first time unit on the second carrier according to a first rule after the carrier switching occurs, wherein the plurality of PUCCHs does not overlap in a time domain on the first carrier.

In FIG. 10, a bus architecture may include any number of interconnected buses and bridges. Specifically, various circuits such as one or more processors represented by the processor 1010 and a memory represented by the memory 1020 are linked together. The bus architecture may also link together various other circuits, such as peripheral devices, voltage regulators, and power management circuits, etc. which are well known in the art, and therefore are not further described herein. The bus interface provides an interface. The transceiver 1000 may be a plurality of elements, i.e. include a transmitter and a receiver, and provide units for communicating with various other devices on transmission media. The transmission media include transmission media such as a wireless channel, a wired channel, and an optical cable. The processor 1010 is responsible for managing the bus architecture and general processing, and the memory 1020 may store data used by the processor 1010 when performing an operation.

Optionally, the processor 1010 may be a Central Processing Unit (CPU), An Application-Specific Integrated Circuit (ASIC), a Field-Programmable Gate Array (FPGA), or a Complex Programmable Logic Device (CPLD), and the processor 1010 may also adopt a multi-core architecture.

Optionally, the processor 1010 is configured to read the computer program in the memory and perform the following operations:

> rule 1: determining a first PUCCH resource in the first time unit on the second carrier, and receiving the PUCCH by using the first PUCCH resource in the first time unit on the second carrier, wherein the first PUCCH resource is used to carry Uplink Control Information (UCI) carried by all of the plurality of PUCCHs;
>
> rule 2: receiving the plurality of PUCCHs in the first time unit on the second carrier in a time division multiplexing (TDM) manner, wherein each PUCCH corresponds to one of the plurality of PUCCHs;
>
> rule 3: selecting part of the plurality of PUCCHs, discarding part of the plurality of PUCCHs, and receiving a PUCCH corresponding to the selected part of the plurality of PUCCHs in the first time unit on the second carrier by using the rule 1 or the rule 2;
>
> rule 4: determining as an error schedule or configuration.

Optionally, when the rule 1 is used, the processor 1010 is configured to read the computer program in the memory and perform the following operations:

> first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining a first PUCCH resource in the first time unit on the second carrier according to a start symbol and the number of symbols of the second PUCCH resource;
>
> second method: if there is a PUCCH corresponding to a physical downlink control channel (PDCCH) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;
>
> third method: determining a first-type PUCCH resource preconfigured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;
>
> fourth method: performing UCI multiplexing according to assumption that there is time-domain overlapping among the plurality of PUCCHs, and obtaining the bit number of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

Optionally, when adopting the first method, the frequency domain resource of the first PUCCH resource is the same as the frequency domain resource of the second PUCCH resource, and/or the code domain resource of the first PUCCH resource is the same as the code domain resource of the second PUCCH resource.

Optionally, when the first method is used, the time unit of transmitting the PUCCH on the first carrier and the time unit of transmitting the PUCCH on the second carrier have the same unit, or the time unit of transmitting the PUCCH on the first carrier is less than or equal to the time unit of transmitting the PUCCH on the second carrier.

Optionally, when it is determined that the first PUCCH resource is the first-type PUCCH resource, the processor 1010 is configured to read the computer program in the memory and perform the following operations:

> obtaining the minimum number of resource blocks (RBs) actually occupied by the first PUCCH resource, according to the number of UCI bits that need to be transmitted on the first PUCCH resource and a preset transmission parameter of the first PUCCH resource;
>
> receiving the PUCCH through the first PUCCH resource based on the minimum number of RBs in the first time unit on the second carrier, wherein the first PUCCH resource carries UCIs carried by the plurality of PUCCHs.

Optionally, the processor 1010 is configured to read the computer program in the memory and perform the following operations:

when the third method is used, if the number of bits of the UCI that needs to be transmitted on the first PUCCH resource is insufficient to use the predetermined threshold for using encoding transmission, supplementing information in the UCI until the predetermined threshold for using the encoding transmission is reached.

Optionally, when using the fourth method, the processor 1010 is configured to read the computer program in the memory and perform the following operations:

when the PUCCH resource set includes only one first-type PUCCH resource and one second-type PUCCH resource, determining a PUCCH resource in the one first-type PUCCH resource and the one second-type PUCCH resource as the first PUCCH resource according to the UCI bit number;

when the PUCCH resource set includes a plurality of first-type PUCCH resources and/or a plurality of second-type PUCCH resources, determining a type of PUCCH resources in the plurality of first-type PUCCH resources and the plurality of second-type PUCCH resources according to the number of bits of the UCI; when the determined type of PUCCH resources includes a plurality of PUCCH resources, selecting a PUCCH resource, satisfying a first preset condition, from the determined type of PUCCH resources as the first PUCCH resource.

The first preset condition is one of the following:

a starting position does not exceed starting positions of PUCCH resources corresponding to the plurality of PUCCHs on the first carrier;

a starting position does not exceed a starting position of a second PUCCH resource which is obtained by multiplexing the UCIs on the first carrier according to the assumption that there is time-domain overlapping among the plurality of PUCCHs, and which is used for transmitting the multiplexed UCIs on the first carrier;

processing time requirement of the UCI transmission is satisfied.

Optionally, if the number of PUCCH resources satisfying the first preset condition is multiple, a PUCCH resource is determined as the first PUCCH resource according to a preset selection rule.

The preset selection rule is at least one of following:

selecting one PUCCH resource with the earliest starting symbol;

selecting one PUCCH resource occupying the least number of symbols;

selecting one PUCCH resource which meets the minimum of the carrying capacity;

selecting one PUCCH resource with the smallest PUCCH resource number.

Optionally, when the rule 2 is used, the processor 1010 is configured to read the computer program in the memory and perform the following operations:

determining a symbol, in a first time unit on the second carrier, overlapping a symbol corresponding to each of the plurality of PUCCHs on a first carrier as a third PUCCH resource of each of the plurality of PUCCHs on the second carrier.

Optionally, the processor 1010 is configured to read the program instructions in the memory and perform the following operations:

when the same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;

for one PUCCH of the plurality of PUCCHs, if the number of symbols of a third PUCCH resource corresponding to the one PUCCH on the second carrier is less than the number of symbols of the PUCCH resource corresponding to the one PUCCH on the first carrier, then according to a carrying capacity or a target code rate of the third PUCCH resource, receiving a part, not exceeding the carrying capacity or the target code rate, of the UCI carried in the one PUCCH in the first time unit on the second carrier;

for one PUCCH of the plurality of PUCCHs, if the number of symbols of a PUCCH resource corresponding to the one PUCCH on the first carrier is less than or equal to a first threshold, and the number of symbols of a third PUCCH resource corresponding to the one PUCCH on the second carrier is greater than or equal to a second threshold, then determining to use one PUCCH format of a pre-defined or pre-configured third-type PUCCH formats, and receiving UCI, in a first time unit on the second carrier, carried on the one PUCCH by using the third PUCCH resource, wherein the third-type PUCCH formats are PUCCH formats having a symbol number greater than or equal to the second threshold;

for one PUCCH of the plurality of PUCCHs, if the number of symbols of a PUCCH resource corresponding to the one PUCCH on the first carrier is greater than or equal to the second threshold, and the number of symbols of a third PUCCH resource corresponding to the one PUCCH on the second carrier is less than or equal to the first threshold, then determining to use one PUCCH format of pre-defined or pre-configured fourth-type PUCCH formats, and receiving the UCI carried on the one PUCCH in the first time unit on the second carrier by using the third PUCCH resource, wherein the fourth-type PUCCH formats are PUCCH formats having a symbol number less than or equal to the first threshold, and the first threshold is less than the second threshold.

In the network-side device of the embodiments of the present disclosure, a plurality of physical uplink control channels (PUCCHs) transmitted on a first carrier need the carrier switching, and it is determined that the plurality of PUCCHs are transmitted in a first time unit on a second carrier after carrier switching, and the network-side device receives the PUCCHs after the switching in a first time unit on the second carrier according to the first rule, wherein the plurality of PUCCHs on the first carrier do not overlap in the time domain, so that PUCCH transmission can be realized in a PUCCH carrier switching manner.

Figure 11:
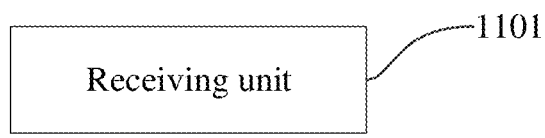
FIG. 11 is a schematic block diagram of a carrier switching transmission apparatus according to the embodiments of the present disclosure.

As shown in FIG. 11, an implementation of the present disclosure further provides a carrier switching transmission apparatus. The apparatus includes:

a receiving unit 1101, configured to, when a plurality of physical uplink control channels (PUCCHs) transmitted on a first carrier needs to do carrier switching, and all of the plurality of PUCCHs is determined to be transmitted in a first time unit on a second carrier after the carrier switching, receive the plurality of PUCCHs in the first time unit on the second carrier according to a first rule after the carrier switching, wherein the plurality of PUCCHs does not overlap in a time domain on the first carrier.

Optionally, the receiving unit 1101 is specifically configured for:
- rule 1: determining a first PUCCH resource in the first time unit on the second carrier, and receiving the PUCCH by using the first PUCCH resource in the first time unit on the second carrier, wherein the first PUCCH resource is used to simultaneously carry Uplink Control Information (UCI) carried by the plurality of PUCCHs;
- rule 2: receiving the plurality of PUCCHs in the first time unit on the second carrier in a time division multiplexing (TDM) manner, wherein each PUCCH corresponds to one of the plurality of PUCCHs;
- rule 3: selecting part of the plurality of PUCCHs, discarding part of the plurality of PUCCHs, and receiving a PUCCH corresponding to the selected part of the plurality of PUCCHs in the first time unit on the second carrier by using the rule 1 or the rule 2;
- rule 4: determining as an error schedule or configuration.

Optionally, when the rule 1 is used, the receiving unit 1101 is specifically configured to perform following:
- first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining a first PUCCH resource in the first time unit on the second carrier according to a start symbol and the number of symbols of the second PUCCH resource;
- second method: if there is a PUCCH corresponding to a physical downlink control channel (PDCCH) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;
- third method: determining a first-type PUCCH resource preconfigured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;
- fourth method: determining the UCI multiplexing according to assumption that there is time-domain overlapping among the plurality of PUCCHs, and obtaining the bit number of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

Optionally, when adopting the first method, the frequency domain resource of the first PUCCH resource is the same as the frequency domain resource of the second PUCCH resource, and/or the code domain resource of the first PUCCH resource is the same as the code domain resource of the second PUCCH resource.

Optionally, when the first method is used, the time unit of transmitting the PUCCH on the first carrier and the time unit of transmitting the PUCCH on the second carrier have the same unit, or the time unit of transmitting the PUCCH on the first carrier is less than or equal to the time unit of transmitting the PUCCH on the second carrier.

Optionally, when it is determined that the first PUCCH resource is the first-type PUCCH resource, the receiving unit 1101 is specifically configured for:
- obtaining the minimum number of resource blocks (RBs) actually occupied by the first PUCCH resource, according to the number of UCI bits that need to be transmitted on the first PUCCH resource and a preset transmission parameter of the first PUCCH resource;
- receiving the PUCCH through the first PUCCH resource based on the minimum number of RBs in the first time unit on the second carrier, wherein the first PUCCH resource carries all of UCIs carried by the plurality of PUCCHs.

Optionally, the carrier switching transmission apparatus further includes a third processing unit configured for:
- when the third method is used, if the number of bits of the UCI that needs to be transmitted on the first PUCCH resource is insufficient to use the predetermined threshold for using encoding transmission, supplementing information in the UCI until the predetermined threshold for using the encoding transmission is reached.

Optionally, when using the fourth method, the receiving unit 1101 is specifically configured for:
- when the PUCCH resource set includes only one first-type PUCCH resource and one second-type PUCCH resource, determining a PUCCH resource in the one first-type PUCCH resource and the one second-type PUCCH resource as the first PUCCH resource according to the UCI bit number; or
- when the PUCCH resource set includes a plurality of first-type PUCCH resources and/or a plurality of second-type PUCCH resources, determining a type of PUCCH resources in the plurality of first-type PUCCH resources and the plurality of second-type PUCCH resources according to the number of bits of the UCI; when the determined type of PUCCH resources includes a plurality of PUCCH resources, selecting a PUCCH resource, satisfying a first preset condition, from the determined type of PUCCH resources as the first PUCCH resource.

The first preset condition is one of the following:
- a starting position does not exceed starting positions of PUCCH resources corresponding to the plurality of PUCCHs on the first carrier;
- a starting position does not exceed a starting position of a second PUCCH resource which is obtained by multiplexing the UCIs on the first carrier according to the assumption that there is time-domain overlapping among the plurality of PUCCHs, and which is used for transmitting the multiplexed UCIs on the first carrier;
- processing time requirement of the UCI transmission is satisfied.

Optionally, if the number of PUCCH resources satisfying the first preset condition is multiple, a PUCCH resource is determined as the first PUCCH resource according to a preset selection rule.

The preset selection rule is at least one of following:
selecting one PUCCH resource with the earliest starting symbol;
selecting one PUCCH resource occupying the least number of symbols;
selecting one PUCCH resource which meets the minimum of the carrying capacity;
selecting one PUCCH resource with the smallest PUCCH resource number.

Optionally, when the rule 2 is used, the carrier switching transmission apparatus further includes a fourth unit configured for:
determining a symbol, in a first time unit on the second carrier, overlapping a symbol corresponding to each of the plurality of PUCCHs on a first carrier as a third PUCCH resource of each of the plurality of PUCCHs on the second carrier.

Optionally, the carrier switching transmission apparatus further performs following:
when the same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;
for one PUCCH of the plurality of PUCCHs, if the number of symbols of a third PUCCH resource corresponding to the one PUCCH on the second carrier is less than the number of symbols corresponding to the PUCCH resource of the one PUCCH on the first carrier, then according to a carrying capacity or a target code rate of the third PUCCH resource, receiving a part, not exceeding the carrying capacity or the target code rate, of the UCI carried in the one PUCCH in the first time unit on the second carrier;
for one PUCCH of the plurality of PUCCHs, if the number of symbols of a PUCCH resource corresponding to one PUCCH on the first carrier is less than or equal to a first threshold, and the number of symbols of a third PUCCH resource corresponding to the one PUCCH on the second carrier is greater than or equal to a second threshold, then determining to use one PUCCH format of a pre-defined or pre-configured third-type PUCCH formats, and receiving UCI, in a first time unit on the second carrier, carried on the one PUCCH by using the third PUCCH resource, wherein the third-type PUCCH formats are PUCCH formats having a symbol number greater than or equal to the second threshold;
for one PUCCH of the plurality of PUCCHs, if the number of symbols of a PUCCH resource corresponding to the one PUCCH on the first carrier is greater than or equal to the second threshold, and the number of symbols of a third PUCCH resource corresponding to the one PUCCH on the second carrier is less than or equal to the first threshold, then determining to use one PUCCH format of pre-defined or pre-configured fourth-type PUCCH formats, and receiving the UCI carried on the one PUCCH in the first time unit on the second carrier by using the third PUCCH resource, wherein the fourth-type PUCCH formats are PUCCH formats having a symbol number less than or equal to the first threshold, and the first threshold is less than the second threshold.

In the carrier switching transmission apparatus of the embodiments of the present disclosure, a plurality of physical uplink control channels (PUCCHs) transmitted on a first carrier need the carrier switching, and it is determined that all of the plurality of PUCCHs are transmitted in a first time unit on a second carrier after carrier switching, and the network-side device receives the PUCCHs after the switching in a first time unit on the second carrier according to the first rule, wherein the plurality of PUCCHs on the first carrier do not overlap in the time domain, so that PUCCH transmission can be realized in a PUCCH carrier switching manner.

It should be noted that, the division of the units in the embodiments of the present disclosure is schematic, but is merely a logical function division, and there may be another division manner in actual implementation. In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a processor-readable storage medium. Based on such understanding, some essential parts, or parts contributing to the related art, or all, of the technical solutions of the present disclosure may be embodied in the form of a software product, and the computer software product is stored in a storage medium, and includes several instructions for enabling a computer device (which may be a personal computer, a server, or a network device, etc.) or a processor to perform all or part of the steps of the method according to various embodiments of the present disclosure. The foregoing storage medium includes various media that can store program codes, such as a USB flash disk, a mobile hard disk, a read-only memory (ROM), a random access memory (RAM), a magnetic disk, or an optical disk.

It should be noted that the above-mentioned apparatuses provided in the embodiments of the present disclosure can implement all method steps implemented by the foregoing method embodiments, and can achieve the same technical effect, and the same parts between the apparatus and the method and beneficial effects of the method embodiments are not described in detail herein.

In some embodiments of the present disclosure, a processor-readable storage medium is further provided, the processor-readable storage medium stores program instructions, and the program instructions are configured to cause the processor to perform the following steps:
when a plurality of physical uplink control channels (PUCCHs) transmitted on a first carrier needs to do carrier switching, and all of the plurality of PUCCHs are determined to be transmitted in a first time unit on a second carrier after the carrier switching, receiving the plurality of PUCCHs in the first time unit on the second carrier according to a first rule after the carrier switching occurs, wherein the plurality of PUCCHs does not overlap in a time domain on the first carrier.

When the program is executed by the processor, all implementations of the foregoing method embodiments applied to the network-side device as shown in FIG. 2 may be implemented, and in order to avoid repetition, details are not described herein again.

The technical solutions provided in the embodiments of the present disclosure may be applied to various systems, especially 5G systems. For example, the applicable system may be a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Long Term Evolution Advanced (LTE-A) system, a Universal Mobile Telecommunication System (UMTS), a Worldwide interoperability for Microwave Access (WiMAX) system, a 5G New Radio (NR) system, etc. Each system includes a terminal device and a network device. The system may further include a core network portion, such as an Evolved Packet System (EPS), a 5G system (5 GS), etc.

The terminal device according to the embodiments of the present disclosure may be a device that provide voice and/or data connectivity to user, a handheld device having a wireless connection function, or other processing devices connected to a wireless modem, etc. In different systems, the name of the terminal device may also be different, for example, in a 5G system, the terminal device may be referred to as a User Equipment (UE). A wireless terminal device may communicate with one or more Core Networks (CN) via a Radio Access Network (RAN), and may be a mobile terminal device, such as a mobile phone (or referred to as a "cellular" phone) and a computer with a mobile terminal device, for example, may be a portable, pocket, handheld, computer built-in or vehicle-mounted mobile device that exchanges voice and/or data with the radio access network. For example, devices such as a Personal Communication Service (PCS) phone, a cordless telephone, a Session Initiation Protocol (SIP) phone, a Wireless Local Loop (WLL) station, a Personal Digital Assistant (PDA), etc. The wireless terminal device may also be referred to as a system, a subscriber unit, a subscriber station, a mobile station, a mobile, a remote station, an access point, a remote terminal, an access terminal, a user terminal, a user agent, and a user device, which are not limited in the embodiments of the present disclosure.

The network-side device according to the embodiments of the present disclosure may be a base station, and the base station may include a plurality of cells that provide services for the terminal. According to different specific application occasions, a base station may also be referred to as an access point, or may be a device in an access network that communicates with a wireless terminal device through one or more sectors on an air interface, or other names. The network device may be configured to replace the received air frame with the Internet Protocol (IP) packet, or vice versa, to serve as a router between the wireless terminal device and the remaining portion of the access network, wherein the remaining portion of the access network may include an Internet Protocol (IP) communication network. The network device may also coordinate attribute management of the air interface. For example, the network device involved in the embodiments of the present disclosure may be a network device (BTS) in a Global System for Mobile Communications (GSM) or Code Division Multiple Access (CDMA) system, or may be a network device (Node B) in a WideBand Code Division Multiple Access (WCDMA), or may also be a evolutional Node B, eNB or e-Node B in a Long Term Evolution (LTE) system, a 5G base station in a Next Generation (5G) System, or a Home evolved Node B (HeNB), a relay node, a home base station (femto), a pico base station (pico), etc. which is not limited in the embodiments of the present disclosure. In some network structures, the network device may include a Centralized Unit (CU) node and a Distributed Unit (DU) node, and the Centralized Unit and the Distributed Unit may also be geographically separated.

A Multi-Input Multi-Output (MIMO) transmission may be performed between the network-side device and the terminal device by using one or more antennas, and the MIMO transmission may be Single-User MIMO (SU-MIMO) or Multiple-User MIMO (MU-MIMO). According to the form and quantity of the root antenna combination, MIMO transmission may be 2D-MIMO, 3D-MIMO, FD-MIMO, or Massive-MIMO, or may be diversity transmission or precoding transmission or beamforming transmission, etc.

Those skilled in the art should understand that the embodiments of the present disclosure may be provided as a method, a system, or a computer program product. Thus, the present disclosure may take the form of an entire hardware embodiment, an entire software embodiment, or embodiments incorporating software and hardware aspects. Moreover, the present disclosure may take the form of a computer program product implemented on one or more computer-usable storage media (including but not limited to a disk memory and an optical memory, etc.) including computer-usable program codes.

The present disclosure is described with reference to flowcharts and/or block diagrams of methods, apparatuses (systems), and computer program products according to embodiments of the present disclosure. It should be understood that each flow and/or block in the flowcharts and/or block diagrams, and combinations of flows and/or blocks in the flowcharts and/or block diagrams, can be implemented by computer-executable instructions. These computer-executable instructions may be provided to a processor of a general purpose computer, a special purpose computer, an embedded processor, or other programmable data processing device to generate a machine such that instructions executed by a processor of the computer or other programmable data processing device generate means for implementing functions specified in one or more flows of the flowcharts and/or one or more blocks of the block diagrams.

These processor-executable instructions may also be stored in a processor-readable memory that can direct a computer or other programmable data processing device to operate in a particular manner such that the instructions stored in the processor-readable memory produce a product that includes an instruction device that implements the functions specified in one or more flows of the flowchart and/or one or more blocks of the block diagram.

These processor-executable instructions may also be loaded onto a computer or other programmable data processing device such that a series of operational steps are performed on a computer or other programmable device to produce a computer-implemented process, such that the instructions executed on the computer or other programmable device provide steps for implementing the functions specified in one or more flows of the flowchart and/or one or more blocks of the block diagram.

It should be noted that, it should be understood that the division of the above modules is merely a division of a logical function, and all or some of the modules may be integrated onto one physical entity during actual implementation, or may be physically separated. In addition, these modules may all be implemented in the form of software invoked by a processing element, or may all be implemented in the form of hardware; or some modules may be implemented in the form of a processing element invoking software, and some of the modules are implemented in the form of hardware. For example, the determining module may be a separately configured processing element, or may be integrated in a certain chip of the foregoing apparatus, and in addition, the determining module may also be stored in a memory of the apparatus in the form of program codes, and a certain processing element of the apparatus invokes and executes the functions of the determining module. Implementations of other modules are similar. In addition, all or part of these modules may be integrated together, or may be implemented independently. The processing element described herein may be an integrated circuit having a signal processing capability. In an implementation process, each step of the above-mentioned method or each of the above modules may be completed by means of an integrated logic circuit of hardware in the processor element or an instruction in a software form.

For example, each module, unit, sub-unit, or sub-module may be one or more integrated circuits configured to implement the above method, for example, one or more Application Specific Integrated Circuits (ASICs), or one or more digital signal processors (DSPs), or one or more Field Programmable Gate Arrays (FPGAs), etc. For another example, when a certain module is implemented in the form of a processing element invoking program codes, the processing element may be a general-purpose processor, for example, a Central Processing Unit (CPU) or another processor that may invoke a program code. For another example, these modules may be integrated together and implemented in the form of a system-on-a-chip (SOC).

The terms "first", "second" and the like in the specification and claims of the present disclosure are used to distinguish similar objects, and do not need to be used to describe a specific order or sequence. It should be understood that the terms used in this way may be interchanged under appropriate circumstances so that the embodiments of the disclosure described herein, for example, are implemented in an order other than those illustrated or described herein. Furthermore, the terms "include" and "have" and any variations thereof are intended to cover non-exclusive inclusion, for example, processes, methods, systems, products, or devices that include a series of steps or units are not necessarily limited to those steps or units clearly listed, but may include other steps or units not expressly listed or inherent to these processes, methods, products, or devices. In addition, the description and the claims use "and/or" to indicate at least one of the connected objects, such as A and/or B and/or C, indicating seven cases that A exists alone, B exists alone, C exists alone, both A and B exist, both B and C exist, both A and C exist, and all A, B and C exist. Similarly, the use of "at least one of A and B" in this specification and in the claims should be understood as "a single A exists, a single B exists, or both A and B exist".

Obviously, those skilled in the art may make various modifications and variations to the present disclosure without departing from the spirit and scope of the present disclosure. Thus, if these modifications and variations of the present disclosure fall within the scope of the claims and their equivalents, the present disclosure is also intended to encompass these modifications and variations.

What is claimed is:

1. A carrier switching transmission method, comprising:
   when a plurality of physical uplink control channels (PUCCHs) transmitted on a first carrier needs to do carrier switching and all of the plurality of PUCCHs are determined to be transmitted in a first time unit on a second carrier after the carrier switching, sending by a terminal one or more PUCCHs after the carrier switching, in the first time unit on the second carrier according to a first rule,
   wherein the plurality of PUCCHs does not overlap in a time domain on the first carrier,
   wherein sending by the terminal the one or more PUCCHs after the carrier switching in the first time unit on the second carrier according to the first rule comprises one of following rule 1 to rule 4:
   rule 1: determining a first PUCCH resource in the first time unit on the second carrier, multiplexing uplink control information (UCI) carried by the plurality of PUCCHs on the first PUCCH resource, and sending the multiplexed UCI in the first time unit on the second carrier; or
   rule 2: sending multiple PUCCHs in the first time unit on the second carrier in a time division multiplexing (TDM) manner, wherein each PUCCH of the multiple PUCCHs corresponds to one of the plurality of PUCCHs; or
   rule 3: selecting part of the plurality of PUCCHs, discarding part of the plurality of PUCCHs, and sending a PUCCH corresponding to the selected part of the plurality of PUCCHs in the first time unit on the second carrier by using the rule 1 or the rule 2; or
   rule 4: determining as an error schedule or configuration,
   wherein, when the rule 2 is used, the method further comprises:
   determining a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

2. The method according to claim 1, wherein when the rule 1 is used, determining the first PUCCH resource in the first time unit on the second carrier comprises one of following:
   first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;
   second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set includes at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

3. The method according to claim 2, wherein, when the first method is used, a frequency domain resource of the first PUCCH resource is same as a frequency domain resource of the second PUCCH resource, and/or a code domain resource of the first PUCCH resource is same as a code domain resource of the second PUCCH resource;

or when the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier;

or wherein the method further comprises: when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached;

or when using the fourth method, determining the first PUCCH resource comprises:
  when the PUCCH resource set comprises only one first-type PUCCH resource and one second-type PUCCH resource, determining a PUCCH resource from the one first-type PUCCH resource and the one second-type PUCCH resource as the first PUCCH resource according to the quantity of bits of the UCI;
  or
  when the PUCCH resource set comprises a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources comprises a plurality of PUCCH resources, selecting a PUCCH resource, satisfying a first preset condition, from the determined type of PUCCH resources as the first PUCCH resource;

wherein the first preset condition is one of following:
  a starting position does not exceed a starting position of any PUCCH resource corresponding to the plurality of PUCCHs on the first carrier;
  a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;
  processing time requirement of the UCI transmission is satisfied;
or
when determining that the first PUCCH resource is the first-type PUCCH resource, the method further comprises:
  obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;
  multiplexing, on the first PUCCH resource based on the minimum quantity of RBs, the UCI carried by the plurality of PUCCHs, and sending the multiplexed UCI in the first time unit on the second carrier.

4. The method according to claim 3, wherein when using the fourth method, if a quantity of PUCCH resources satisfying the first preset condition is multiple, a PUCCH resource is determined as the first PUCCH resource according to a preset selection rule, wherein the preset selection rule is at least one of following:
  selecting a PUCCH resource with an earliest starting symbol;
  selecting a PUCCH resource occupying a least quantity of symbols;
  selecting a PUCCH resource which meets a minimum carrying capacity;
  selecting a PUCCH resource with a smallest PUCCH resource index.

5. The method according to claim 1, wherein, when the rule 2 is used, the method further comprises at least one of:
  when a same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;
  for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, sending a part, not exceeding the carrying capacity or the target code rate, of the UCI carried in the one PUCCH in the first time unit on the second carrier;
  for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and transmitting UCI, carried on the one PUCCH, in the first time unit on the second carrier by using the third PUCCH resource, wherein the third-type PUCCH formats are PUCCH formats having a symbol quantity greater than or equal to the second threshold;

for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and transmitting the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

6. A carrier switching transmission method, comprising:
when a plurality of physical uplink control channels (PUCCHs) transmitted on a first carrier needs to do carrier switching and all of the plurality of PUCCHs are determined to be transmitted in a first time unit on a second carrier after the carrier switching, receiving by a network-side device one or more PUCCHs after the carrier switching in the first time unit on the second carrier according to a first rule,
wherein the plurality of PUCCHs does not overlap in a time domain on the first carrier,
wherein sending by the network-side device the one or more PUCCHs after the carrier switching in the first time unit on the second carrier according to the first rule comprises one of following rule 1 to rule 4:
  rule 1: determining a first PUCCH resource in the first time unit on the second carrier, and receiving the one or more PUCCHs by using the first PUCCH resource in the first time unit on the second carrier, wherein the first PUCCH resource is used to carry simultaneously Uplink Control Information (UCI) carried by the plurality of PUCCHs; or
  rule 2: receiving multiple PUCCHs in the first time unit on the second carrier in a time division multiplexing (TDM) manner, wherein each PUCCH of the multiple PUCCHs corresponds to one of the plurality of PUCCHs; or
  rule 3: selecting part of the plurality of PUCCHs, discarding part of the plurality of PUCCHs, and receiving a PUCCH corresponding to the selected part of the plurality of PUCCHs in the first time unit on the second carrier by using the rule 1 or the rule 2; or
  rule 4: determining as an error schedule or configuration,
wherein, when the rule 2 is used, the method further comprises:
  determining a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

7. The method according to claim 6, wherein, when the rule 1 is used, determining the first PUCCH resource in the first time unit on the second carrier comprises one of following:
  first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;
  second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;
  third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;
  fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set comprises at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

8. The method according to claim 7, wherein,
when the first method is used, a frequency domain resource of the first PUCCH resource is same as a frequency domain resource of the second PUCCH resource, and/or a code domain resource of the first PUCCH resource is same as a code domain resource of the second PUCCH resource;
or
when the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier;
or
the method further comprises: when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached;
or
when using the fourth method, determining the first PUCCH resource comprises:
  when the PUCCH resource set comprises only one first-type PUCCH resource and one second-type PUCCH resource, determining a PUCCH resource from the one first-type PUCCH resource and the one second-type PUCCH resource as the first PUCCH resource according to the quantity of bits of the UCI;
  or
  when the PUCCH resource set comprises a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources comprises a plurality of PUCCH resources, selecting a PUCCH resource, satisfying a first preset condition, from the determined type of PUCCH resources as the first PUCCH resource;
wherein the first preset condition is one of following:
  a starting position does not exceed a starting position of any PUCCH resource corresponding to the plurality of PUCCHs on the first carrier;
  a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;
  processing time requirement of the UCI transmission is satisfied;
or,
when determining that the first PUCCH resource is the first-type PUCCH resource, the method further comprises:
  obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;
  receiving the one or more PUCCHs through the first PUCCH resource in the first time unit on the second carrier based on the minimum quantity of RBs, wherein the first PUCCH resource simultaneously carries UCI carried by the plurality of PUCCHs.

9. The method according to claim 8, wherein when using the fourth method, if a quantity of PUCCH resources satisfying the first preset condition is multiple, a PUCCH resource is determined as the first PUCCH resource according to a preset selection rule, wherein the preset selection rule is at least one of following:
  selecting a PUCCH resource with an earliest starting symbol;
  selecting a PUCCH resource occupying a least quantity of symbols;
  selecting a PUCCH resource which meets a minimum carrying capacity;
  selecting a PUCCH resource with a smallest PUCCH resource index.

10. The method according to claim 7, wherein when the rule 2 is used, the method further comprises at least one of following:
  when a same symbol on the second carrier overlaps with symbols corresponding to at least two PUCCHs in the plurality of PUCCHs on the first carrier, determining that the symbol on the second carrier only belongs to a third PUCCH resource corresponding to one PUCCH of the at least two PUCCHs on the second carrier;
  for one PUCCH of the plurality of PUCCHs, if a quantity of symbols of a third PUCCH resource corresponding to the one PUCCH on the second carrier is less than a quantity of symbols of a PUCCH resource corresponding to the one PUCCH on the first carrier, then according to a carrying capacity or a target code rate of the third PUCCH resource, receiving only a part, not exceeding the carrying capacity or the target code rate, of the UCI carried in the one PUCCH in the first time unit on the second carrier;
  for one PUCCH of the plurality of PUCCHs, if a quantity of symbols of a PUCCH resource corresponding to the one PUCCH on the first carrier is less than or equal to a first threshold, and a quantity of symbols of a third PUCCH resource corresponding to the one PUCCH on the second carrier is greater than or equal to a second threshold, then determining to use one PUCCH format of a pre-defined or pre-configured third-type PUCCH formats, and receiving UCI, carried on the one PUCCH, in the first time unit on the second carrier by using the third PUCCH resource, wherein the third-type PUCCH formats are PUCCH formats having a symbol quantity greater than or equal to the second threshold;
  for one PUCCH of the plurality of PUCCHs, if a quantity of symbols of a PUCCH resource corresponding to the one PUCCH on the first carrier is greater than or equal to the second threshold, and a quantity of symbols of a third PUCCH resource corresponding to the one PUCCH on the second carrier is less than or equal to the first threshold, then determining to use one PUCCH format of pre-defined or pre-configured fourth-type PUCCH formats, and receiving the UCI, carried on the one PUCCH, in the first time unit on the second carrier by using the third PUCCH resource, wherein the fourth-type PUCCH formats are PUCCH formats having a symbol quantity less than or equal to the first threshold, and the first threshold is less than the second threshold.

11. A terminal, comprising:
a memory, a transceiver, and a processor, wherein the memory is configured to store program instructions, the transceiver is configured to transmit and receive data under control of the processor, the processor is configured to read the program instructions in the memory and perform following operations:
  when a plurality of physical uplink control channels (PUCCHs) transmitted on a first carrier needs to do carrier switching and all of the plurality of PUCCHs are determined to be transmitted in a first time unit on a second carrier after the carrier switching, sending one or more PUCCHs after the carrier switching in the first time unit on the second carrier according to a first rule,
wherein the plurality of PUCCHs does not overlap in a time domain on the first carrier, wherein the processor is configured to read the program instructions in the memory and perform one of following rule 1 to rule 4:

rule 1: determining a first PUCCH resource in the first time unit on the second carrier, multiplexing, on the first PUCCH resource, uplink control information (UCI) carried by the plurality of PUCCHs, and sending the multiplexed UCI in the first time unit on the second carrier; or rule 2: sending multiple PUCCHs in the first time unit on the second carrier in a time division multiplexing (TDM) manner, wherein each PUCCH of the multiple PUCCHs corresponds to one of the plurality of PUCCHs; or rule 3: selecting part of the plurality of PUCCHs, discarding part of the plurality of PUCCHs, and sending a PUCCH corresponding to the selected part of the plurality of PUCCHs in the first time unit on the second carrier by using the rule 1 or the rule 2; or rule 4: determining as an error schedule or configuration, wherein, when the rule 2 is used, the processor is configured to read the program instructions in the memory and perform the following operations:

determining a symbol set, in the first time unit on the second carrier, overlapped with a symbol set corresponding to each PUCCH of the plurality of PUCCHs on the first carrier as a third PUCCH resource corresponding to each PUCCH of the plurality of PUCCHs on the second carrier.

12. The terminal according to claim 11, wherein when the rule 1 is used, the processor is configured to read the program instructions in the memory and perform the following operations:

first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;

second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set preconfigured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set comprises at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

13. The terminal according to claim 12, wherein, when the first method is used, a frequency domain resource of the first PUCCH resource is same as a frequency domain resource of the second PUCCH resource, and/or a code domain resource of the first PUCCH resource is same as a code domain resource of the second PUCCH resource;

or when the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier;

or the processor is configured to read the program instructions in the memory and perform the following operations:

when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached;

or, when using the fourth method, the processor is configured to read program instructions in the memory and perform the following operations:

when the PUCCH resource set comprises only one first-type PUCCH resource and one second-type PUCCH resource, determining a PUCCH resource from the one first-type PUCCH resource and the one second-type PUCCH resource as the first PUCCH resource according to the quantity of bits of the UCI; or when the PUCCH resource set comprises a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources comprises a plurality of PUCCH resources, selecting a PUCCH resource, satisfying a first preset condition, from the determined type of PUCCH resources as the first PUCCH resource;

wherein the first preset condition is one of following:

a starting position does not exceed a starting position of any PUCCH resource corresponding to the plurality of PUCCHs on the first carrier;

a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;

processing time requirement of the UCI transmission is satisfied;

or, when determining that the first PUCCH resource is the first-type PUCCH resource, the processor is configured to read the program instructions in the memory and perform the following operations:

obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;

multiplexing, on the first PUCCH resource based on the minimum quantity of RBs, the UCI carried by the plurality of PUCCHs, and sending the multiplexed UCI in the first time unit on the second carrier.

14. A network-side device, comprising:
a memory, a transceiver, and a processor, wherein the memory is configured to store a computer program, the transceiver is configured to transmit and receive data under control of the processor, the processor is configured to read the computer program in the memory and perform
steps of the carrier switching transmission method according to claim 6.

15. The network-side device according to claim 14, wherein when the rule 1 is used, the processor is configured to read the computer program in the memory and perform the following operations:

first method: performing UCI multiplexing on the first carrier according to a case with assumption that there is overlapping among the plurality of PUCCHs in the time domain, and obtaining a second PUCCH resource for multiplexing transmission of the UCI on the first carrier, and determining the first PUCCH resource in the first time unit on the second carrier according to a start symbol and a quantity of symbols of the second PUCCH resource;

second method: if there are one or more PUCCHs corresponding to one or more physical downlink control channels (PDCCHs) in the plurality of PUCCHs, determining, according to a PUCCH resource indication field in a first PDCCH, one PUCCH resource as the first PUCCH resource from a PUCCH resource set pre-configured on the second carrier, wherein the first PDCCH is the last PDCCH in all PDCCHs corresponding to the plurality of PUCCHs, or the last PDCCH in one or more PDCCHs corresponding to the last PUCCH of the plurality of PUCCHs;

third method: determining a first-type PUCCH resource pre-configured on the second carrier as the first PUCCH resource, wherein there is one first-type PUCCH resource pre-configured on the second carrier, and the first-type PUCCH resource is a PUCCH resource corresponding to a first type of preset PUCCH formats, or a PUCCH resource having a carrying capacity greater than a preset threshold;

fourth method: performing UCI multiplexing according to assumption that there is time-domain overlapping among the plurality of PUCCHs, to obtain a bit quantity of the multiplexed UCI, and determining one PUCCH resource from a PUCCH resource set preconfigured on the second carrier as the first PUCCH resource, wherein the PUCCH resource set comprises at least one first-type PUCCH resource and at least one second-type PUCCH resource, wherein the first-type PUCCH resource is a PUCCH resource corresponding to a first-type of preset PUCCH formats, or a PUCCH resource having a carrying capacity greater than a preset threshold, and the second-type PUCCH resource is a PUCCH resource corresponding to a second-type of preset PUCCH formats or a PUCCH resource having a carrying capacity not exceeding a preset threshold.

16. The network-side device according to claim 15, wherein, when the first method is used, a frequency domain resource of the first PUCCH resource is same as a frequency domain resource of the second PUCCH resource, and/or a code domain resource of the first PUCCH resource is same as a code domain resource of the second PUCCH resource;

or when the first method is used, a time unit of transmitting a PUCCH on the first carrier and a time unit of transmitting a PUCCH on the second carrier have a same unit, or a time unit of transmitting a PUCCH on the first carrier is less than or equal to a time unit of transmitting a PUCCH on the second carrier;

or the processor is configured to read the computer program in the memory and perform the following operations:

when the third method is used, if a quantity of bits of the UCI needing to be transmitted on the first PUCCH resource is insufficient to use a predetermined threshold of using encoding transmission, supplementing information in the UCI until the predetermined threshold of using the encoding transmission is reached;

or when the fourth method is adopted, the processor is configured to read the computer program in the memory and perform the following operations:

when the PUCCH resource set comprises only one first-type PUCCH resource and one second-type PUCCH resource, determining a PUCCH resource from the one first-type PUCCH resource and the one second-type PUCCH resource as the first PUCCH resource according to the quantity of bits of the UCI;

or when the PUCCH resource set comprises a plurality of first-type PUCCH resources and/or a plurality of second-type PUCCH resources, determining a type of PUCCH resources from the plurality of first-type PUCCH resources and the plurality of second-type PUCCH resources according to the quantity of bits of the UCI; when the determined type of PUCCH resources comprises a plurality of PUCCH resources, selecting a PUCCH resource, satisfying a first preset condition, from the determined type of PUCCH resources as the first PUCCH resource;

wherein the first preset condition is one of following:

a starting position does not exceed a starting position of any PUCCH resource corresponding to the plurality of PUCCHs on the first carrier;

a starting position does not exceed a starting position of a second PUCCH resource on the first carrier, the second PUCCH resource is a resource for UCI multiplexing on the first carrier which is obtained by multiplexing the UCI according to the case with assumption that there is time-domain overlapping among the plurality of PUCCHs;

processing time requirement of UCI transmission is satisfied;

or
when determining that the first PUCCH resource is the first-type PUCCH resource, the processor is configured to read the computer program in the memory and perform the following operations:
  obtaining a minimum quantity of resource blocks (RBs) actually occupied by the first PUCCH resource, according to a quantity of bits of UCI needing to be transmitted on the first PUCCH resource and a preset transmission parameter of the first PUCCH resource;
  receiving the one or more PUCCHs through the first PUCCH resource in the first time unit on the second carrier based on the minimum quantity of RBs, wherein the first PUCCH resource simultaneously carries UCI carried by the plurality of PUCCHs.

* * * * *